United States Patent
Lesser et al.

(10) Patent No.: US 10,118,699 B2
(45) Date of Patent: *Nov. 6, 2018

(54) INTERACTIVE TRANSPORT SERVICES PROVIDED BY UNMANNED AERIAL VEHICLES

(71) Applicant: X Development LLC, Mountain View, CA (US)

(72) Inventors: Jonathan Lesser, Mountain View, CA (US); Michael Bauerly, Mountain View, CA (US); May Cheng, Mountain View, CA (US); Rue Song, Mountain View, CA (US)

(73) Assignee: Wing Aviation LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/974,311

(22) Filed: May 8, 2018

(65) Prior Publication Data

US 2018/0257777 A1    Sep. 13, 2018

Related U.S. Application Data

(63) Continuation of application No. 15/199,675, filed on Jun. 30, 2016.

(51) Int. Cl.
*B64D 45/00* (2006.01)
*G01C 23/00* (2006.01)
*B64C 39/02* (2006.01)

(52) U.S. Cl.
CPC ............ *B64C 39/024* (2013.01); *B64D 45/00* (2013.01); *B64C 2201/088* (2013.01); *B64C 2201/108* (2013.01); *B64C 2201/128* (2013.01); *B64C 2201/141* (2013.01); *B64C 2201/146* (2013.01)

(58) Field of Classification Search
CPC .................................................. B64C 39/024
See application file for complete search history.

(56) References Cited

U.S. PATENT DOCUMENTS

| 9,305,280 | B1 | 4/2016 | Berg et al. |
| 2009/0099972 | A1* | 4/2009 | Angert .............. G06Q 10/087 705/80 |
| 2014/0032023 | A1 | 1/2014 | Raptopoulous et al. |
| 2015/0120094 | A1 | 4/2015 | Kimchi et al. |

(Continued)

FOREIGN PATENT DOCUMENTS

WO    2016/012741    1/2016

OTHER PUBLICATIONS

International Searching Authority, International Search Report and Written Opinion dated Aug. 28, 2017, issued in connection with International Patent Application No. PCT/US2017/039789, filed on Jun. 28, 2017, 14 pages.

*Primary Examiner* — Joseph Feild
*Assistant Examiner* — Pameshanand Mahase
(74) *Attorney, Agent, or Firm* — McDonnell Boehnen Hulbert & Berghoff LLP

(57) ABSTRACT

Embodiments relate to a client-facing application for interacting with a transport service that transports items via unmanned aerial vehicles (UAVs). An example graphic interface may allow a user to order items to specific delivery areas associated with their larger delivery location, and may dynamically provide status updates and other functionality during the process of fulfilling a UAV transport request.

20 Claims, 16 Drawing Sheets

(56) References Cited

U.S. PATENT DOCUMENTS

| | | | |
|---|---|---|---|
| 2015/0227888 A1* | 8/2015 | Levanon | G06Q 10/0834 |
| | | | 705/334 |
| 2015/0302495 A1 | 10/2015 | Stuckman et al. | |
| 2016/0012393 A1 | 1/2016 | Wang et al. | |
| 2016/0059963 A1 | 3/2016 | Burgess et al. | |
| 2016/0068265 A1 | 3/2016 | Hoareau et al. | |
| 2016/0111006 A1 | 4/2016 | Srivastava et al. | |
| 2017/0249681 A1* | 8/2017 | Ferrari | G06Q 30/0617 |
| 2017/0372259 A1* | 12/2017 | Lesser | B64C 39/024 |

* cited by examiner

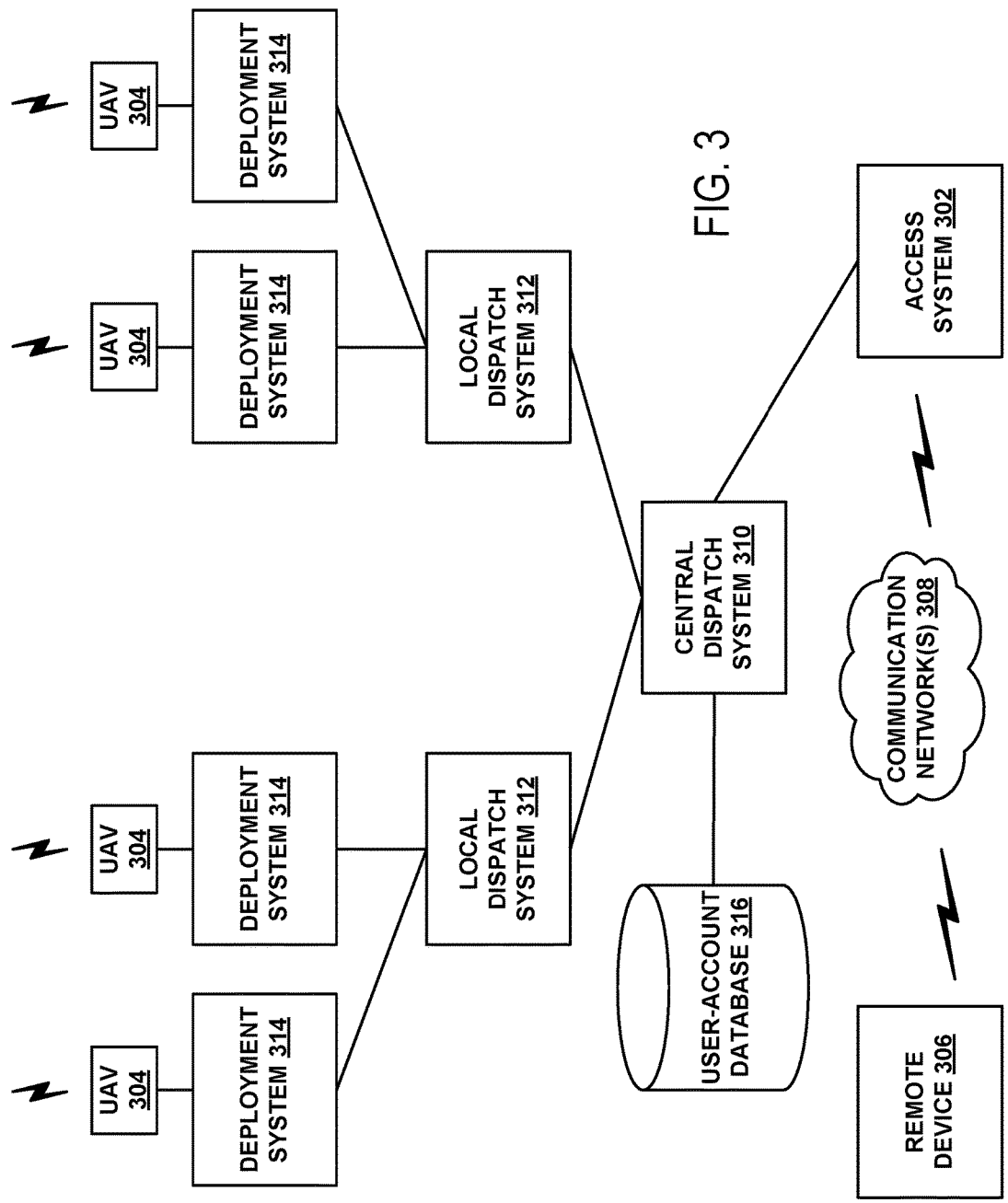

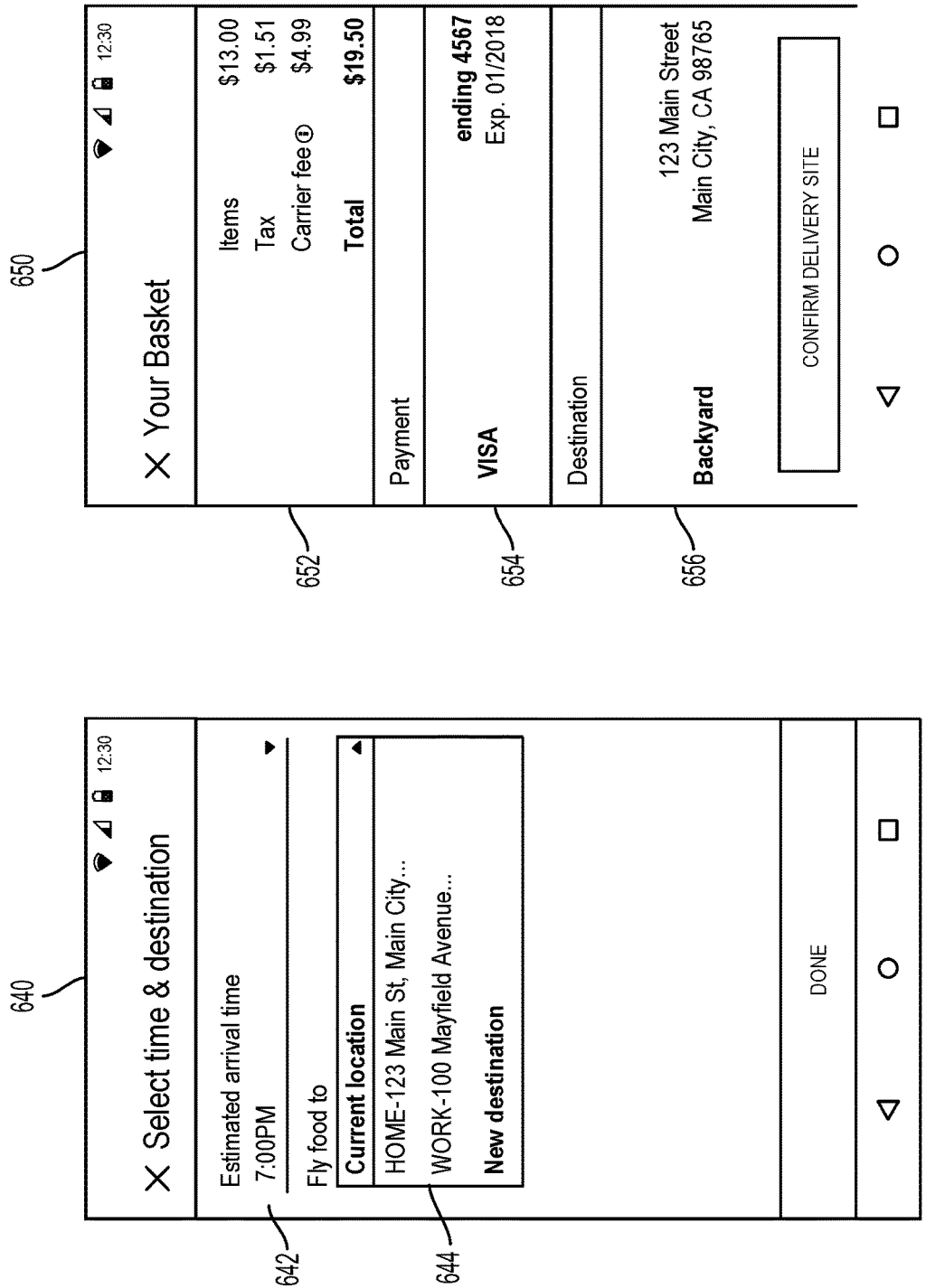

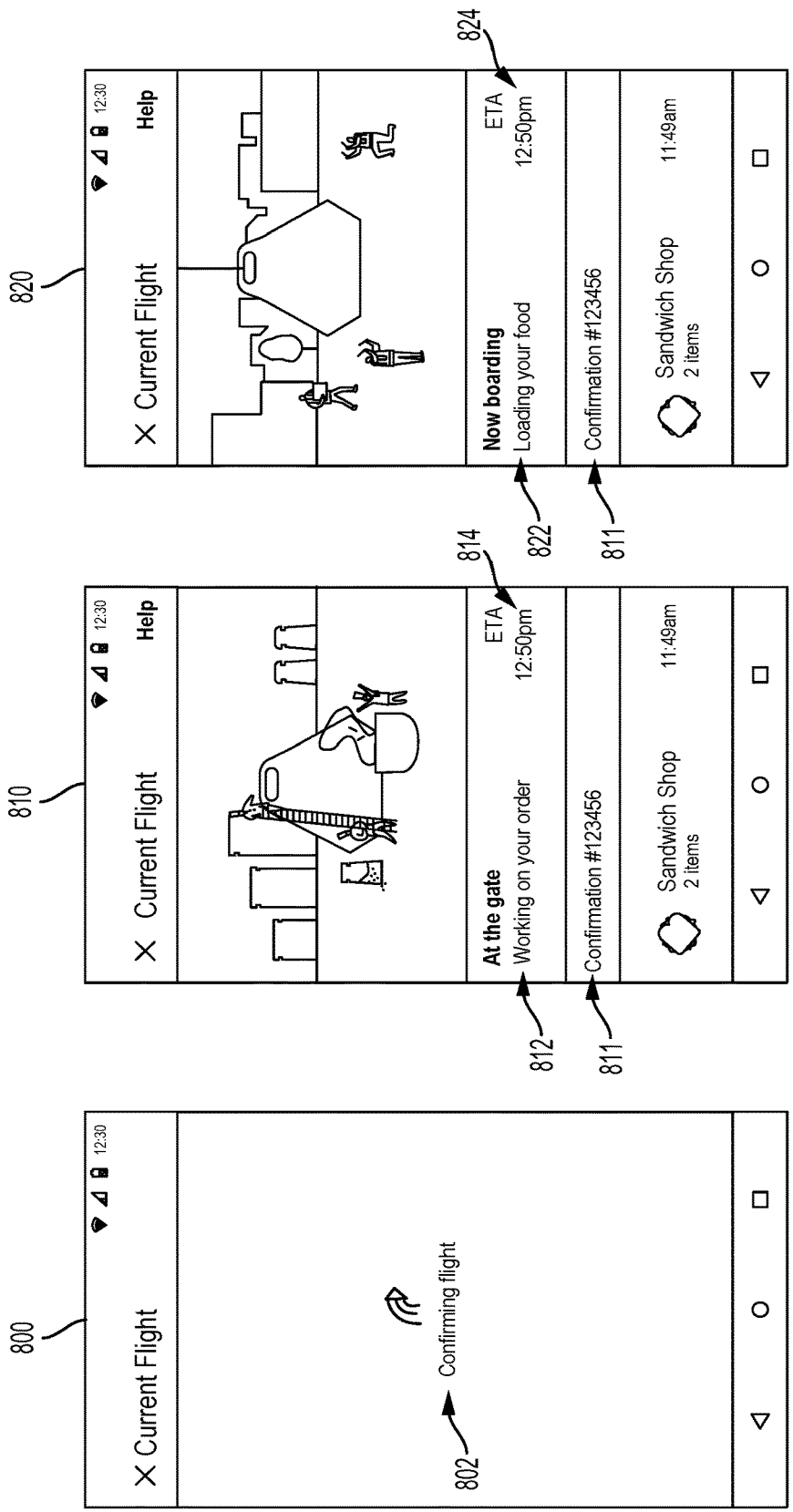

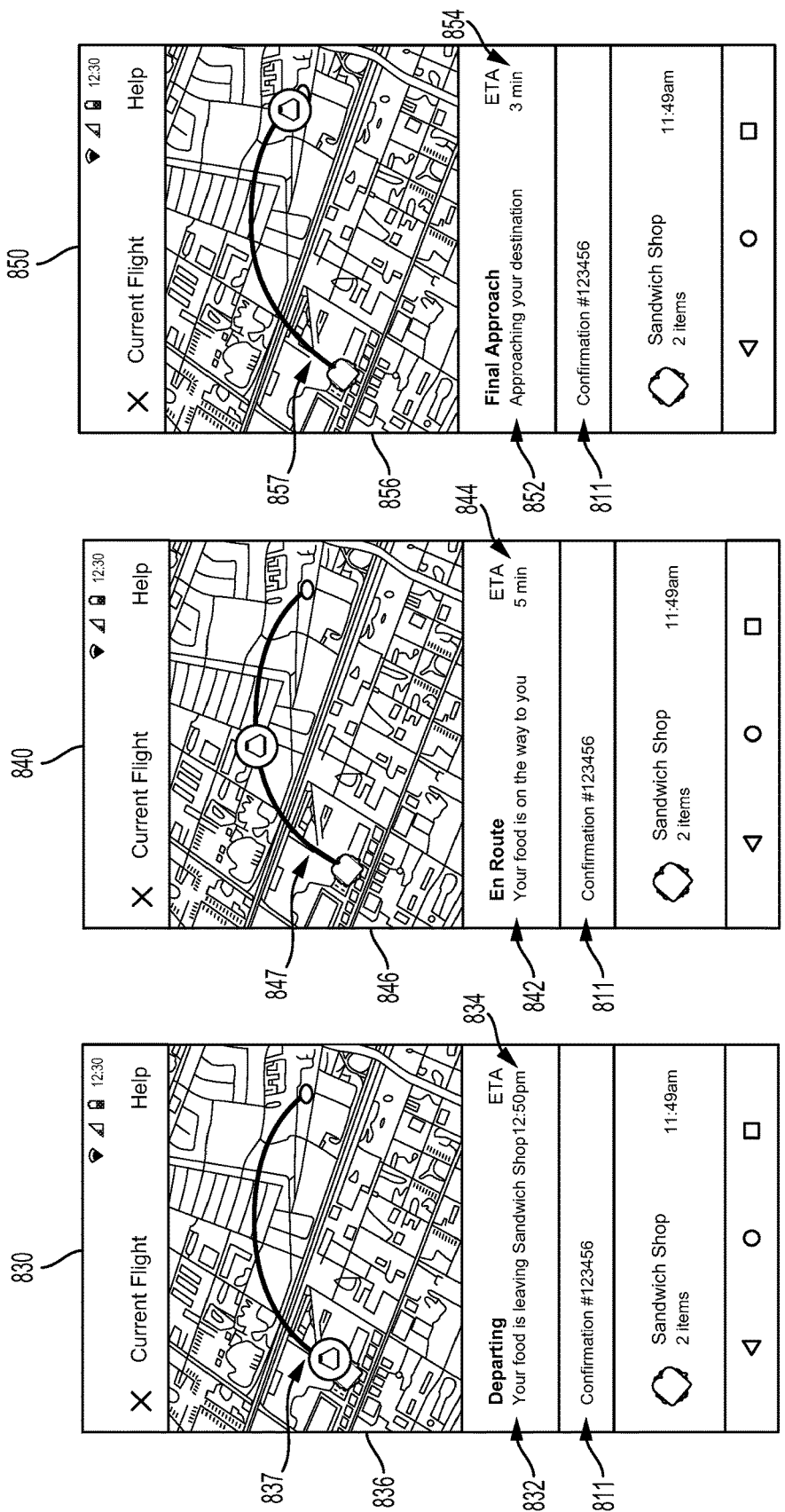

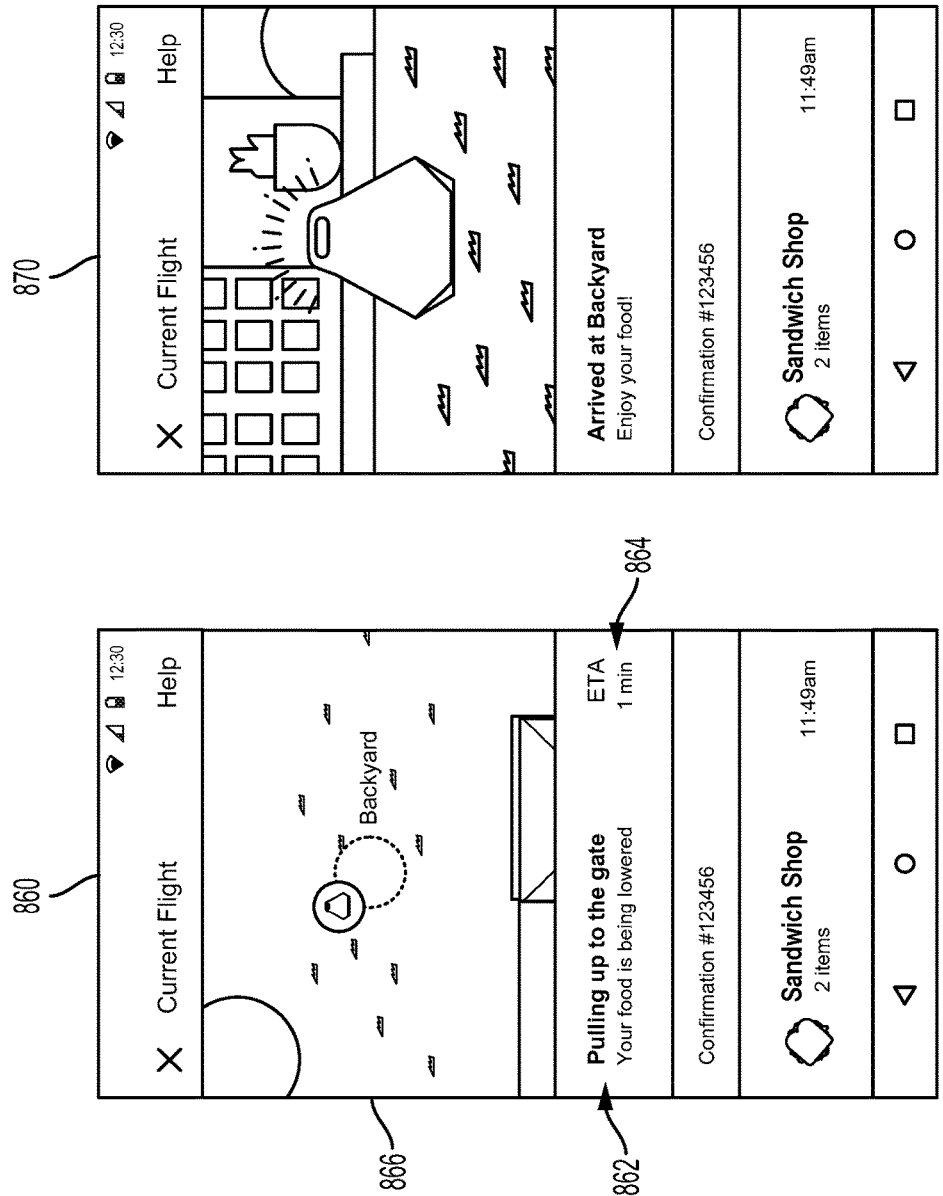

INTERACTIVE TRANSPORT SERVICES PROVIDED BY UNMANNED AERIAL VEHICLES

CROSS-REFERENCE TO RELATED APPLICATION

This application is a continuation of U.S. patent application Ser. No. 15/199,675, filed on Jun. 30, 2016, which is incorporated herein by reference in its entirety and for all purposes.

BACKGROUND

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so concurrently. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Examples include quad-copters and tail-sitter UAVs, among others. Unmanned vehicles also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible.

SUMMARY

Certain aspects of conventional delivery methods may lead to a poor consumer experience. For instance, a restaurant employee delivering a food order by car may get stuck in traffic, delaying delivery of the food. This delay may inconvenience a hungry consumer not only by causing them to wait longer for their food, but also perhaps causing the temperature of hot food or cold food to approach room temperature. In another example, a conventional delivery service may only be capable of delivering a package to a limited number of destinations (e.g., a mailbox, post office box, or doorstep associated with a particular address). This may be problematic if a consumer wishes to have an item delivered to a location that does not have a conventional delivery destination, or in the event the consumer change their delivery location mid-flight.

Accordingly, example embodiments may provide a client-facing application for UAV delivery, which allows for UAV transport requests to be placed, and provides intelligent status updates and related functionality during the process of preparing items for UAV transport, and UAV flight to a delivery location. Advantageously, a service-provider system may take advantage of various factors, some of which are unique to autonomous UAV delivery, to provide highly accurate time of arrival estimates (e.g., +/−1 minute) in a client-facing application. As such, the UAV delivery application may provide an improved user experience, as compared to typical (e.g., car or bicycle) food delivery services. (Of course, the accuracy of arrival estimates and other possible benefits described herein are not to be construed as required or limiting in any way.)

In one aspect, an example method involves a client computing device receiving a transport request for transport of one or more items to a target location by a UAV, and responsively displaying a preparation status screen including: (a) a transport-preparation status corresponding to transport the one or more selected items, and (b) a first arrival-time estimate, wherein the first arrival-time estimate is determined based on a combination of at least (i) a preparation-to-loading time estimate for the one or more selected items, and (ii) a flight time estimate for transport of the one or more items to the target location by a UAV. Further, the method involves the client computing device receiving a status message indicating that the one or more selected items are loaded on a first UAV for transport to the target location, and responsively displaying a flight progress screen comprising: (a) a map comprising a flight path visualization and a location indication for the first UAV, and (b) an updated arrival time corresponding, wherein the updated arrival time is determined based an updated flight time estimate for transport of the one or more items to the target location by the first UAV. The method further involves, the client computing device receiving a status message indicating that the UAV has released the one or more selected items in a ground delivery area associated with the target location, and responsively displaying a delivery confirmation screen.

In another aspect, an example client-device system includes: a communication interface operable for communications with a service-provider system for a UAV transport service, at least one processor, and a non-transitory computer readable medium comprising program instructions stored thereon. The program instructions are executable by the at least one processor to perform functions comprising: receiving a transport request for transport of one or more items to a target location by a UAV, and responsively displaying a preparation status screen including: (a) a transport-preparation status corresponding to transport the one or more selected items, and (b) a first arrival-time estimate, wherein the first arrival-time estimate is determined based on a combination of at least (i) a preparation-to-loading time estimate for the one or more selected items, and (ii) a flight time estimate for transport of the one or more items to the target location by a UAV; receiving a status message indicating that the one or more selected items are loaded on a first UAV for transport to the target location and responsively displaying a flight progress screen comprising: (a) a map comprising a flight path visualization and a location indication for the first UAV, and (b) an updated arrival time corresponding, wherein the updated arrival time is determined based an updated flight time estimate for transport of the one or more items to the target location by the first UAV; and receiving a status message indicating that the UAV has released the one or more selected items in a ground delivery area associated with the target location, and responsively displaying a delivery confirmation screen.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 3 is a simplified block diagram illustrating a UAV system, according to an example embodiment.

FIG. 6A to 6E are illustrations of interfaces for placing a UAV transport request, according to example embodiments.

FIGS. 8A to 8H show illustrative screens from a client-facing application for a UAV transport service, according to an example embodiment.

DETAILED DESCRIPTION

Figure 1A:
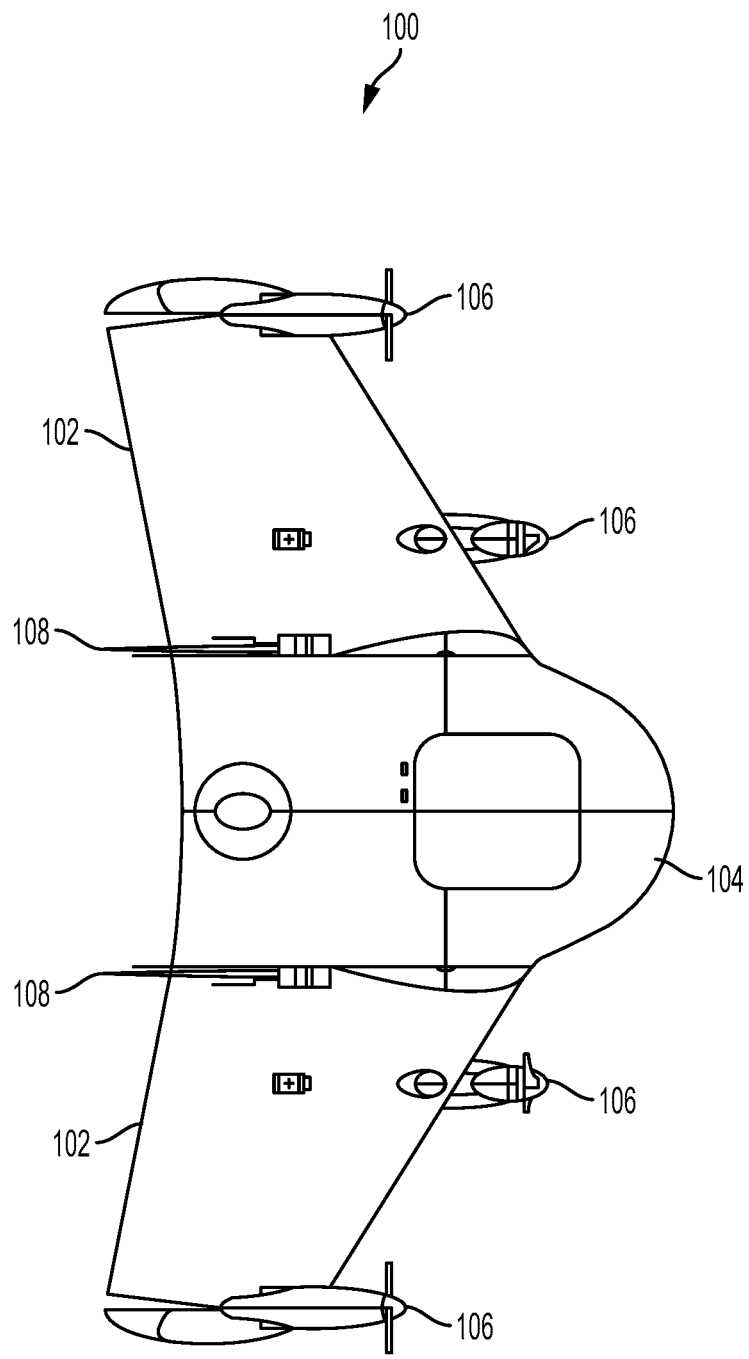
FIG. 1A is a simplified illustration of an unmanned aerial vehicle, according to an example embodiment.

Example methods and systems are described herein. It should be understood that the words "example" and "example" are used herein to mean "serving as an example, instance, or illustration." Any embodiment or feature described herein as being an "example" or "example" is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

I. Overview

Example embodiments take the form of or relate to a graphical user interface (GUI) for a UAV transport application, and/or to the service-provider systems that interface with such a transport-service application and coordinate deliveries of items requested via such an application. In an example embodiment, the user-facing application (also referred to as a client-facing application) may provide access to UAV food transport service via an application running on a user's device; e.g., via an application running on a mobile phone, wearable device, tablet, or personal computer. However, the examples described herein may apply equally to UAV delivery of other types of items. Further, the UAV delivery service may employ UAVs that carry items from a source location (e.g., a restaurant or store) to a target location indicated by the user. The UAVs may be configured to lower items to the ground at the delivery location via a tether attached to the package containing the items.

An example GUI may include features and functions to enhance the delivery experience for the user once an order is placed, by tracking the delivery process and providing updates and functionality corresponding to different phases of the process. In particular, the GUI may provide real-time updates corresponding to two distinct phases of the delivery process (and perhaps sub-phases thereof), and interactive features corresponding to these phases. Further, a backend support system may periodically or continuously update time of arrival estimates for an order, and provide frequent or real-time updates via the GUI. Advantageously, a service-provider system may take advantage of various factors, many of which are unique to autonomous UAV delivery, to provide highly accurate time of arrival estimates (e.g., +/−1 minute). As such, the UAV delivery application may provide an improved user experience, as compared to typical (e.g., car or bicycle) food delivery services.

II. Illustrative Unmanned Vehicles

Herein, the terms "unmanned aerial vehicle" and "UAV" refer to any autonomous or semi-autonomous vehicle that is capable of performing some functions without a physically present human pilot.

A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "unmanned aerial vehicle system" (UAVS), or "unmanned aerial system" (UAS) may also be used to refer to a UAV.

FIG. 1A is a simplified illustration providing a top-down view of a UAV, according to an example embodiment. In particular, FIG. 1A shows an example of a fixed-wing UAV 100, which may also be referred to as an airplane, an aeroplane, a biplane, a glider, or a plane, among other possibilities. The fixed-wing UAV 100, as the name implies, has stationary wings 102 that generate lift based on the wing shape and the vehicle's forward airspeed. For instance, the two wings 102 may have an airfoil-shaped cross section to produce an aerodynamic force on the UAV 100.

As depicted, the fixed-wing UAV 100 may include a wing body 104 rather than a clearly defined fuselage. The wing body 104 may contain, for example, control electronics such as an inertial measurement unit (IMU) and/or an electronic speed controller, batteries, other sensors, and/or a payload, among other possibilities. The illustrative UAV 100 may also include landing gear (not shown) to assist with controlled take-offs and landings. In other embodiments, other types of UAVs without landing gear are also possible.

The UAV 100 further includes propulsion units 106, which can each include a motor, shaft, and propeller, for propelling the UAV 100. Vertical stabilizers 108 (or fins) may also be attached to the wing body 104 and/or the wings 102 to stabilize the UAV's yaw (turn left or right) during flight. In some embodiments, the UAV 100 may be also be configured to function as a glider. To do so, UAV 100 may power off its motor, propulsion units, etc., and glide for a period of time.

During flight, the UAV 100 may control the direction and/or speed of its movement by controlling its pitch, roll, yaw, and/or altitude. For example, the vertical stabilizers 108 may include one or more rudders for controlling the UAV's yaw, and the wings 102 may include one or more elevators for controlling the UAV's pitch and/or one or more ailerons for controlling the UAV's roll. As another example, increasing or decreasing the speed of all the propellers simultaneously can result in the UAV 100 increasing or decreasing its altitude, respectively.

Figure 1B:
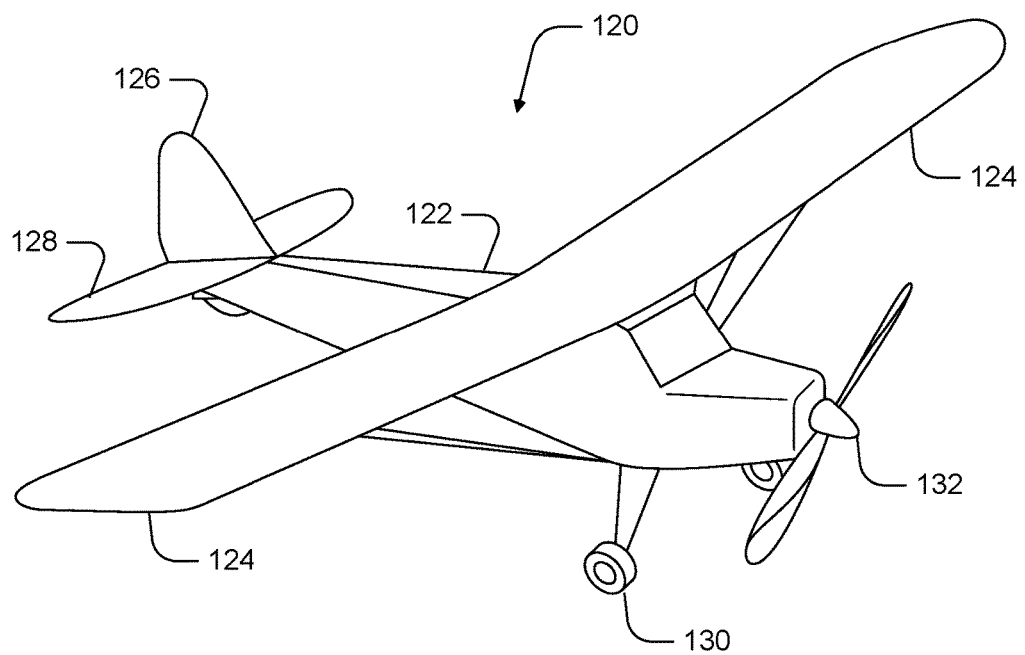
FIG. 1B is a simplified illustration of an unmanned aerial vehicle, according to an example embodiment.

Similarly, FIG. 1B shows another example of a fixed-wing UAV 120. The fixed-wing UAV 120 includes a fuselage 122, two wings 124 with an airfoil-shaped cross section to provide lift for the UAV 120, a vertical stabilizer 126 (or fin) to stabilize the plane's yaw (turn left or right), a horizontal stabilizer 128 (also referred to as an elevator or tailplane) to stabilize pitch (tilt up or down), landing gear 130, and a propulsion unit 132, which can include a motor, shaft, and propeller.

Figure 1C:
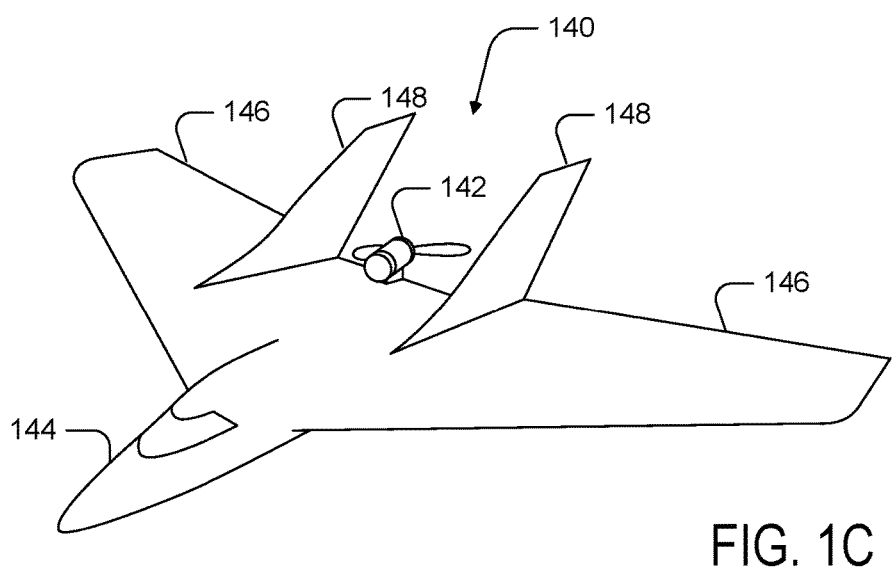
FIG. 1C is a simplified illustration of an unmanned aerial vehicle, according to an example embodiment.

FIG. 1C shows an example of a UAV 140 with a propeller in a pusher configuration. The term "pusher" refers to the fact that a propulsion unit 142 is mounted at the back of the UAV and "pushes" the vehicle forward, in contrast to the propulsion unit being mounted at the front of the UAV. Similar to the description provided for FIGS. 1A and 1B, FIG. 1C depicts common structures used in a pusher plane, including a fuselage 144, two wings 146, vertical stabilizers 148, and the propulsion unit 142, which can include a motor, shaft, and propeller.

Figure 1D:
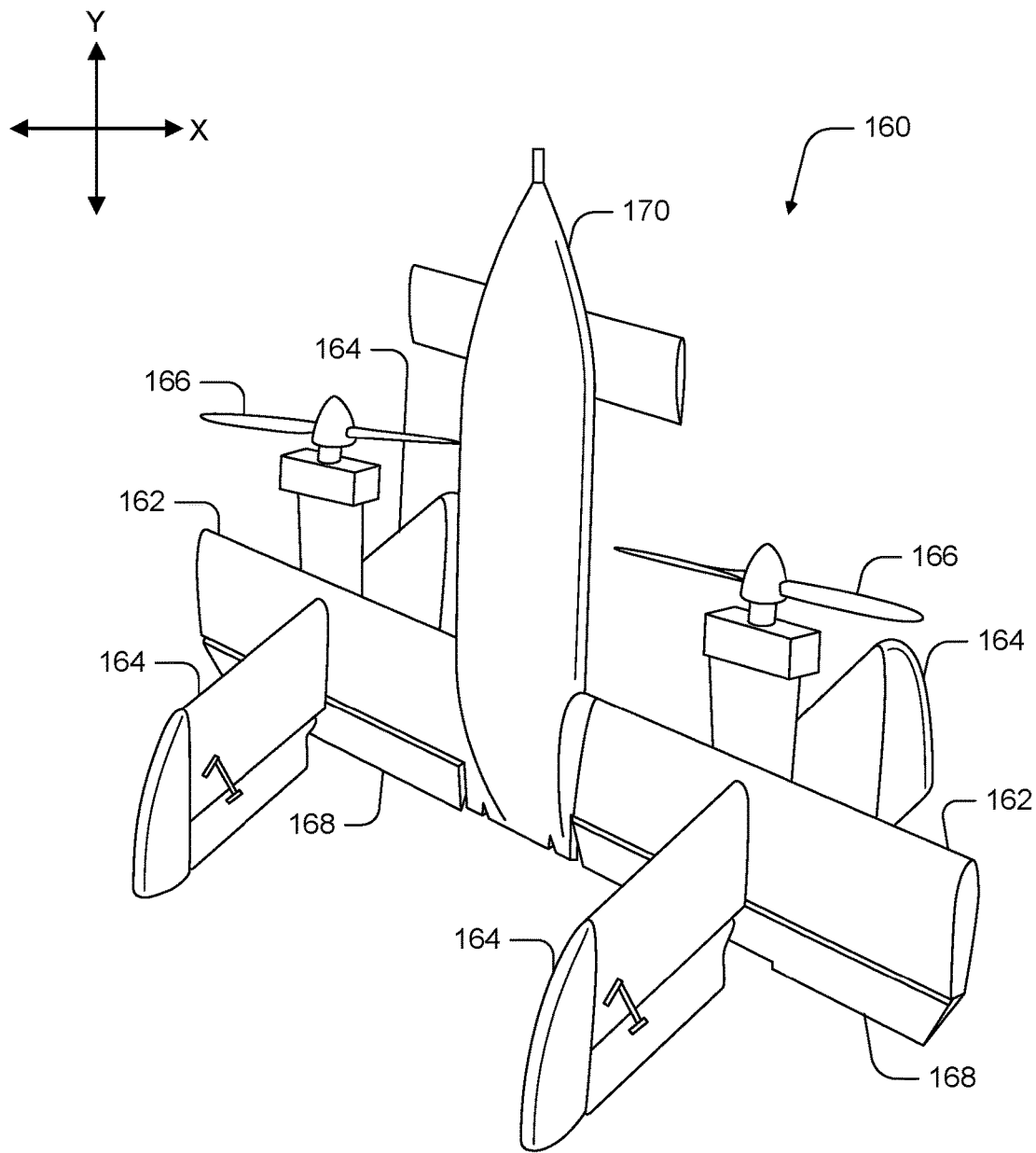
FIG. 1D is a simplified illustration of an unmanned aerial vehicle, according to an example embodiment.

FIG. 1D shows an example of a tail-sitter UAV 160. In the illustrated example, the tail-sitter UAV 160 has fixed wings 162 to provide lift and allow the UAV 160 to glide horizontally (e.g., along the x-axis, in a position that is approximately perpendicular to the position shown in FIG. 1D). However, the fixed wings 162 also allow the tail-sitter UAV 160 to take off and land vertically on its own.

For example, at a launch site, the tail-sitter UAV 160 may be positioned vertically (as shown) with its fins 164 and/or wings 162 resting on the ground and stabilizing the UAV 160 in the vertical position. The tail-sitter UAV 160 may then take off by operating its propellers 166 to generate an upward thrust (e.g., a thrust that is generally along the y-axis). Once at a suitable altitude, the tail-sitter UAV 160 may use its flaps 168 to reorient itself in a horizontal position, such that its fuselage 170 is closer to being aligned with the x-axis than the y-axis. Positioned horizontally, the propellers 166 may provide forward thrust so that the tail-sitter UAV 160 can fly in a similar manner as a typical airplane.

Many variations on the illustrated fixed-wing UAVs are possible. For instance, fixed-wing UAVs may include more or fewer propellers, and/or may utilize a ducted fan or multiple ducted fans for propulsion. Further, UAVs with more wings (e.g., an "x-wing" configuration with four wings), with fewer wings, or even with no wings, are also possible.

Figure 1E:
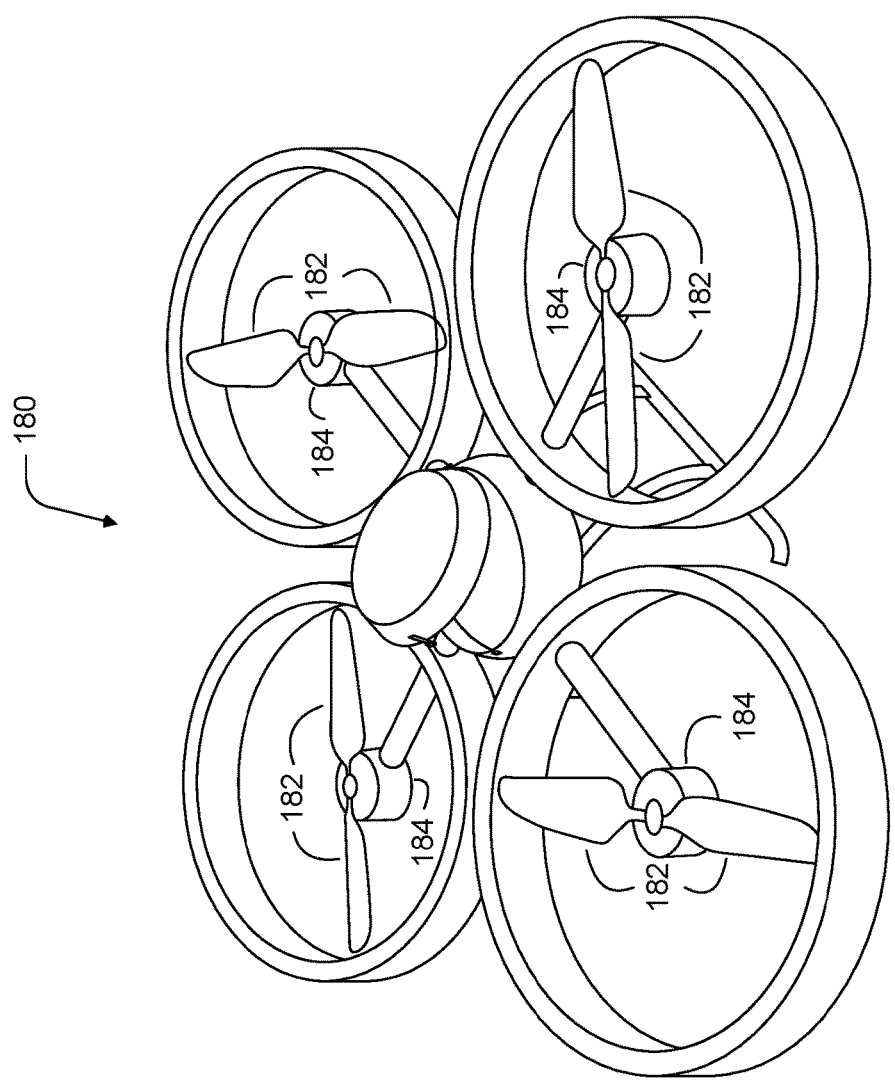
FIG. 1E is a simplified illustration of an unmanned aerial vehicle, according to an example embodiment.

As noted above, some embodiments may involve other types of UAVs, in addition to or in the alternative to fixed-wing UAVs. For instance, FIG. 1E shows an example of a rotorcraft that is commonly referred to as a multicopter 180. The multicopter 180 may also be referred to as a quadcopter, as it includes four rotors 182. It should be understood that example embodiments may involve a rotorcraft with more or fewer rotors than the multicopter 180. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to the multicopter 180 in greater detail, the four rotors 182 provide propulsion and maneuverability for the multicopter 180. More specifically, each rotor 182 includes blades that are attached to a motor 184. Configured as such, the rotors 182 may allow the multicopter 180 to take off and land vertically, to maneuver in any direction, and/or to hover. Further, the pitch of the blades may be adjusted as a group and/or differentially, and may allow the multicopter 180 to control its pitch, roll, yaw, and/or altitude.

It should be understood that references herein to an "unmanned" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

More generally, it should be understood that the example UAVs described herein are not intended to be limiting. Example embodiments may relate to, be implemented within, or take the form of any type of unmanned aerial vehicle.

III. Illustrative UAV Components

Figure 2:
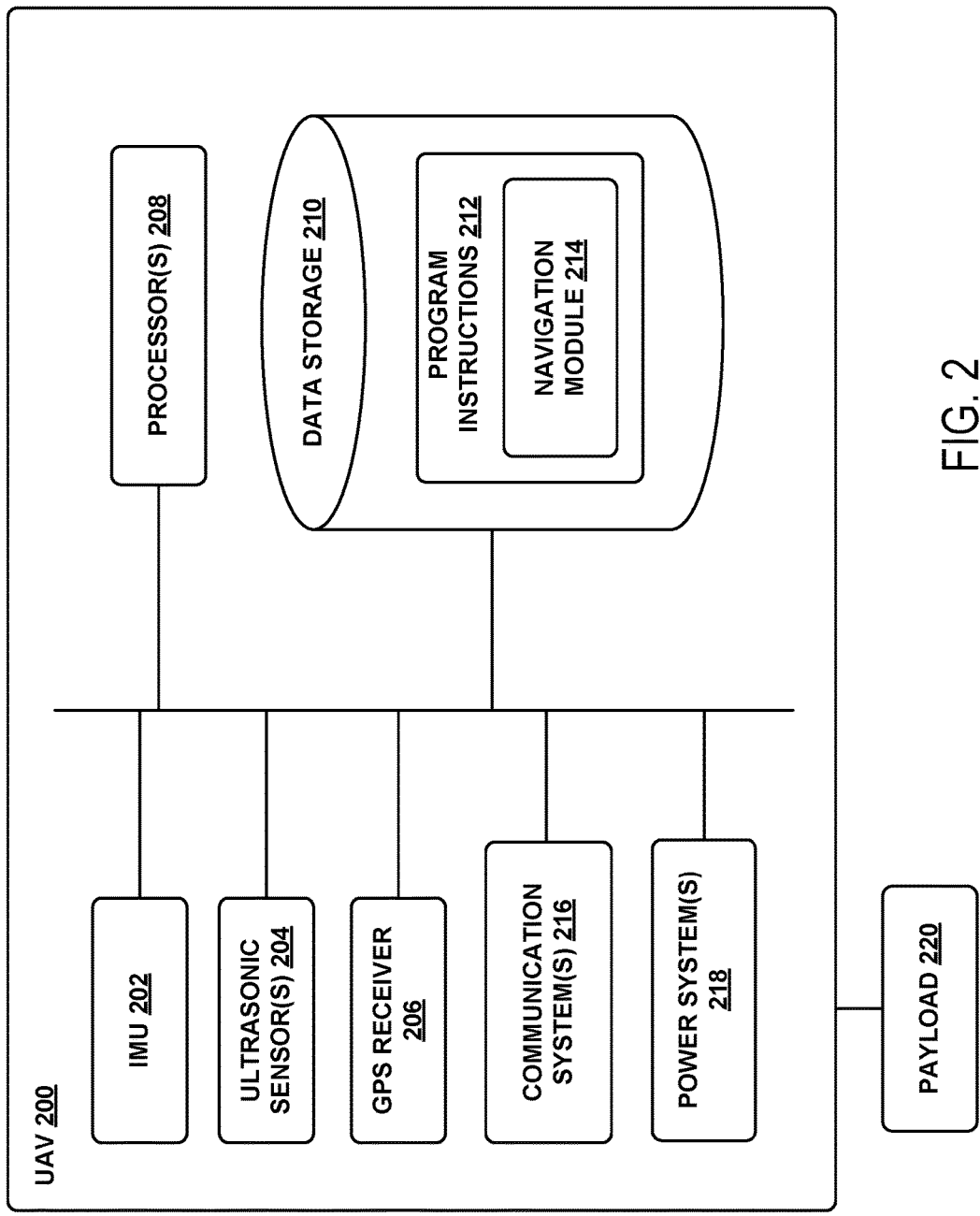
FIG. 2 is a simplified block diagram illustrating components of an unmanned aerial vehicle, according to an example embodiment.

FIG. 2 is a simplified block diagram illustrating components of a UAV 200, according to an example embodiment. UAV 200 may take the form of, or be similar in form to, one of the UAVs 100, 120, 140, 160, and 180 described in reference to FIGS. 1A-1E. However, UAV 200 may also take other forms.

UAV 200 may include various types of sensors, and may include a computing system configured to provide the functionality described herein. In the illustrated embodiment, the sensors of UAV 200 include an inertial measurement unit (IMU) 202, ultrasonic sensor(s) 204, and a GPS 206, among other possible sensors and sensing systems.

In the illustrated embodiment, UAV 200 also includes one or more processors 208. A processor 208 may be a general-purpose processor or a special purpose processor (e.g., digital signal processors, application specific integrated circuits, etc.). The one or more processors 208 can be configured to execute computer-readable program instructions 212 that are stored in the data storage 210 and are executable to provide the functionality of a UAV described herein.

The data storage 210 may include or take the form of one or more computer-readable storage media that can be read or accessed by at least one processor 208. The one or more computer-readable storage media can include volatile and/or non-volatile storage components, such as optical, magnetic, organic or other memory or disc storage, which can be integrated in whole or in part with at least one of the one or more processors 208. In some embodiments, the data storage 210 can be implemented using a single physical device (e.g., one optical, magnetic, organic or other memory or disc storage unit), while in other embodiments, the data storage 210 can be implemented using two or more physical devices.

As noted, the data storage 210 can include computer-readable program instructions 212 and perhaps additional data, such as diagnostic data of the UAV 200. As such, the data storage 210 may include program instructions 212 to perform or facilitate some or all of the UAV functionality described herein. For instance, in the illustrated embodiment, program instructions 212 include a navigation module 214.

A. Sensors

In an illustrative embodiment, IMU 202 may include both an accelerometer and a gyroscope, which may be used together to determine an orientation of the UAV 200. In particular, the accelerometer can measure the orientation of the vehicle with respect to earth, while the gyroscope measures the rate of rotation around an axis. IMUs are commercially available in low-cost, low-power packages. For instance, an IMU 202 may take the form of or include a miniaturized MicroElectroMechanical System (MEMS) or a NanoElectroMechanical System (NEMS). Other types of IMUs may also be utilized.

An IMU 202 may include other sensors, in addition to accelerometers and gyroscopes, which may help to better determine position and/or help to increase autonomy of the UAV 200. Two examples of such sensors are magnetometers and pressure sensors. In some embodiments, a UAV may include a low-power, digital 3-axis magnetometer, which can be used to realize an orientation independent electronic compass for accurate heading information. However, other types of magnetometers may be utilized as well. Other examples are also possible. Further, note that a UAV could include some or all of the above-described inertia sensors as separate components from an IMU.

UAV 200 may also include a pressure sensor or barometer, which can be used to determine the altitude of the UAV 200. Alternatively, other sensors, such as sonic altimeters or radar altimeters, can be used to provide an indication of altitude, which may help to improve the accuracy of and/or prevent drift of an IMU.

In a further aspect, UAV 200 may include one or more sensors that allow the UAV to sense objects in the environment. For instance, in the illustrated embodiment, UAV 200 includes ultrasonic sensor(s) 204. Ultrasonic sensor(s) 204 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

In some embodiments, UAV 200 may also include one or more imaging system(s). For example, one or more still and/or video cameras may be utilized by UAV 200 to capture image data from the UAV's environment. As a specific example, charge-coupled device (CCD) cameras or complementary metal-oxide-semiconductor (CMOS) cameras can be used with unmanned vehicles. Such imaging sensor(s) have numerous possible applications, such as obstacle avoidance, localization techniques, ground tracking for more accurate navigation (e,g., by applying optical flow techniques to images), video feedback, and/or image recognition and processing, among other possibilities.

UAV 200 may also include a GPS receiver 206. The GPS receiver 206 may be configured to provide data that is typical of well-known GPS systems, such as the GPS coordinates of the UAV 200. Such GPS data may be utilized by the UAV 200 for various functions. As such, the UAV may use its GPS receiver 206 to help navigate to the caller's location, as indicated, at least in part, by the GPS coordinates provided by their mobile device. Other examples are also possible.

B. Navigation and Location Determination

The navigation module 214 may provide functionality that allows the UAV 200 to, e.g., move about its environment and reach a desired location. To do so, the navigation module 214 may control the altitude and/or direction of flight by controlling the mechanical features of the UAV that affect flight (e.g., its rudder(s), elevator(s), aileron(s), and/or the speed of its propeller(s)).

In order to navigate the UAV 200 to a target location, the navigation module 214 may implement various navigation techniques, such as map-based navigation and localization-based navigation, for instance. With map-based navigation, the UAV 200 may be provided with a map of its environment, which may then be used to navigate to a particular location on the map. With localization-based navigation, the UAV 200 may be capable of navigating in an unknown environment using localization. Localization-based navigation may involve the UAV 200 building its own map of its environment and calculating its position within the map and/or the position of objects in the environment. For example, as a UAV 200 moves throughout its environment, the UAV 200 may continuously use localization to update its map of the environment. This continuous mapping process may be referred to as simultaneous localization and mapping (SLAM). Other navigation techniques may also be utilized.

In some embodiments, the navigation module 214 may navigate using a technique that relies on waypoints. In particular, waypoints are sets of coordinates that identify points in physical space. For instance, an air-navigation waypoint may be defined by a certain latitude, longitude, and altitude. Accordingly, navigation module 214 may cause UAV 200 to move from waypoint to waypoint, in order to ultimately travel to a final destination (e.g., a final waypoint in a sequence of waypoints).

In a further aspect, the navigation module 214 and/or other components and systems of the UAV 200 may be configured for "localization" to more precisely navigate to the scene of a target location. More specifically, it may be desirable in certain situations for a UAV to be within a threshold distance of the target location where a payload 220 is being delivered by a UAV (e.g., within a few feet of the target destination). To this end, a UAV may use a two-tiered approach in which it uses a more-general location-determination technique to navigate to a general area that is associated with the target location, and then use a more-refined location-determination technique to identify and/or navigate to the target location within the general area.

For example, the UAV 200 may navigate to the general area of a target destination where a payload 220 is being delivered using waypoints and/or map-based navigation. The UAV may then switch to a mode in which it utilizes a localization process to locate and travel to a more specific location. For instance, if the UAV 200 is to deliver a payload to a user's home, the UAV 200 may need to be substantially close to the target location in order to avoid delivery of the payload to undesired areas (e.g., onto a roof, into a pool, onto a neighbor's property, etc.). However, a GPS signal may only get the UAV 200 so far (e.g., within a block of the user's home). A more precise location-determination technique may then be used to find the specific target location.

Various types of location-determination techniques may be used to accomplish localization of the target delivery location once the UAV 200 has navigated to the general area of the target delivery location. For instance, the UAV 200 may be equipped with one or more sensory systems, such as, for example, ultrasonic sensors 204, infrared sensors (not shown), and/or other sensors, which may provide input that the navigation module 214 utilizes to navigate autonomously or semi-autonomously to the specific target location.

As another example, once the UAV 200 reaches the general area of the target delivery location (or of a moving subject such as a person or their mobile device), the UAV 200 may switch to a "fly-by-wire" mode where it is controlled, at least in part, by a remote operator, who can navigate the UAV 200 to the specific target location. To this end, sensory data from the UAV 200 may be sent to the remote operator to assist them in navigating the UAV 200 to the specific location.

As yet another example, the UAV 200 may include a module that is able to signal to a passer-by for assistance in either reaching the specific target delivery location; for example, the UAV 200 may display a visual message requesting such assistance in a graphic display, play an audio message or tone through speakers to indicate the need for such assistance, among other possibilities. Such a visual or audio message might indicate that assistance is needed in delivering the UAV 200 to a particular person or a particular location, and might provide information to assist the passer-by in delivering the UAV 200 to the person or location (e.g., a description or picture of the person or location, and/or the person or location's name), among other possibilities. Such a feature can be useful in a scenario in which the UAV is unable to use sensory functions or another location-determination technique to reach the specific target location. However, this feature is not limited to such scenarios.

In some embodiments, once the UAV 200 arrives at the general area of a target delivery location, the UAV 200 may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., via an RF signal, a light signal and/or an audio signal). In this scenario, the UAV 200 may be configured to navigate by "sourcing" such directional signals—in other words, by determining where the signal is strongest and navigating accordingly. As another example, a mobile device can emit a frequency, either in the human range or outside the human range, and the UAV 200 can listen for that frequency and navigate accordingly. As a related example, if the UAV 200 is listening for spoken commands, then the UAV 200 could utilize spoken statements, such as "I'm over here!" to source the specific location of the person requesting delivery of a payload.

In an alternative arrangement, a navigation module may be implemented at a remote computing device, which communicates wirelessly with the UAV 200. The remote computing device may receive data indicating the operational state of the UAV 200, sensor data from the UAV 200 that allows it to assess the environmental conditions being experienced by the UAV 200, and/or location information for the UAV 200. Provided with such information, the remote computing device may determine altitudinal and/or directional adjustments that should be made by the UAV 200 and/or may determine how the UAV 200 should adjust its mechanical features (e.g., its rudder(s), elevator(s), aileron(s), and/or the speed of its propeller(s)) in order to effectuate such movements. The remote computing system may then communicate such adjustments to the UAV 200 so it can move in the determined manner.

C. Communication Systems

In a further aspect, the UAV 200 includes one or more communication systems 216. The communications systems 216 may include one or more wireless interfaces and/or one or more wireline interfaces, which allow the UAV 200 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, a UAV 200 may include communication systems 216 that allow for both short-range communication and long-range communication. For example, the UAV 200 may be configured for short-range communications using Bluetooth and for long-range communications under a CDMA protocol. In such an embodiment, the UAV 200 may be configured to function as a "hot spot;" or in other words, as a gateway or proxy between a remote support device and one or more data networks, such as a cellular network and/or the Internet. Configured as such, the UAV 200 may facilitate data communications that the remote support device would otherwise be unable to perform by itself.

For example, the UAV 200 may provide a WiFi connection to a remote device, and serve as a proxy or gateway to a cellular service provider's data network, which the UAV might connect to under an LTE or a 3G protocol, for instance. The UAV 200 could also serve as a proxy or gateway to a high-altitude balloon network, a satellite network, or a combination of these networks, among others, which a remote device might not be able to otherwise access.

D. Power Systems

In a further aspect, the UAV 200 may include power system(s) 218. The power system 218 may include one or more batteries for providing power to the UAV 200. In one example, the one or more batteries may be rechargeable and each battery may be recharged via a wired connection between the battery and a power supply and/or via a wireless charging system, such as an inductive charging system that applies an external time-varying magnetic field to an internal battery.

E. Payloads

The UAV 200 may employ various systems and configurations in order to transport a payload 220. In some implementations, the payload 220 of a given UAV 200 may include or take the form of a "package" designed to transport various goods to a target delivery location. For example, the UAV 200 can include a compartment, in which an item or items may be transported. Such a package may one or more food items, purchased goods, medical items, or any other object(s) having a size and weight suitable to be transported between two locations by the UAV. In other embodiments, a payload 220 may simply be the one or more items that are being delivered (e.g., without any package housing the items).

In some embodiments, the payload 220 may be attached to the UAV and located substantially outside of the UAV during some or all of a flight by the UAV. For example, the package may be tethered or otherwise releasably attached below the UAV during flight to a target location. In an embodiment where a package carries goods below the UAV, the package may include various features that protect its contents from the environment, reduce aerodynamic drag on the system, and prevent the contents of the package from shifting during UAV flight.

For instance, when the payload 220 takes the form of a package for transporting items, the package may include an outer shell constructed of water-resistant cardboard, plastic, or any other lightweight and water-resistant material. Further, in order to reduce drag, the package may feature smooth surfaces with a pointed front that reduces the frontal cross-sectional area. Further, the sides of the package may taper from a wide bottom to a narrow top, which allows the package to serve as a narrow pylon that reduces interference effects on the wing(s) of the UAV. This may move some of the frontal area and volume of the package away from the wing(s) of the UAV, thereby preventing the reduction of lift on the wing(s) cause by the package. Yet further, in some embodiments, the outer shell of the package may be constructed from a single sheet of material in order to reduce air gaps or extra material, both of which may increase drag on the system. Additionally or alternatively, the package may include a stabilizer to dampen package flutter. This reduction in flutter may allow the package to have a less rigid connection to the UAV and may cause the contents of the package to shift less during flight.

In order to deliver the payload, the UAV may include a retractable delivery system that lowers the payload to the ground while the UAV hovers above. For instance, the UAV may include a tether that is coupled to the payload by a release mechanism. A winch can unwind and wind the tether to lower and raise the release mechanism. The release mechanism can be configured to secure the payload while being lowered from the UAV by the tether and release the payload upon reaching ground level. The release mechanism can then be retracted to the UAV by reeling in the tether using the winch.

In some implementations, the payload 220 may be passively released once it is lowered to the ground. For example, a passive release mechanism may include one or more swing arms adapted to retract into and extend from a housing. An extended swing arm may form a hook on which the payload 220 may be attached. Upon lowering the release mechanism and the payload 220 to the ground via a tether, a gravitational force as well as a downward inertial force on the release mechanism may cause the payload 220 to detach from the hook allowing the release mechanism to be raised upwards toward the UAV. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of the payload 220 no longer forces the swing arm to extend from the housing. Retracting the swing arm into the housing may reduce the likelihood of the release mechanism snagging the payload 220 or other nearby objects when raising the release mechanism toward the UAV upon delivery of the payload 220.

Active payload release mechanisms are also possible. For example, sensors such as a barometric pressure based altimeter and/or accelerometers may help to detect the position of the release mechanism (and the payload) relative to the ground. Data from the sensors can be communicated back to the UAV and/or a control system over a wireless link and used to help in determining when the release mechanism has reached ground level (e.g., by detecting a measurement with the accelerometer that is characteristic of ground impact). In other examples, the UAV may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, a UAV 200 could include an air-bag drop system or a parachute drop system. Alternatively, a UAV 200 carrying a payload could simply land on the ground at a delivery location. Other examples are also possible.

IV. Illustrative UAV Deployment Systems

UAV systems may be implemented in order to provide various UAV-related services. In particular, UAVs may be provided at a number of different launch sites that may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to provide on-demand transport of various items to locations throughout the geographic area. FIG. 3 is a simplified block diagram illustrating a distributed UAV system 300, according to an example embodiment.

In the illustrative UAV system 300, an access system 302 may allow for interaction with, control of, and/or utilization of a network of UAVs 304. In some embodiments, an access system 302 may be a computing system that allows for human-controlled dispatch of UAVs 304. As such, the control system may include or otherwise provide a user interface through which a user can access and/or control the UAVs 304.

In some embodiments, dispatch of the UAVs 304 may additionally or alternatively be accomplished via one or more automated processes. For instance, the access system 302 may dispatch one of the UAVs 304 to transport a payload to a target location, and the UAV may autonomously navigate to the target location by utilizing various on-board sensors, such as a GPS receiver and/or other various navigational sensors.

Further, the access system 302 may provide for remote operation of a UAV. For instance, the access system 302 may allow an operator to control the flight of a UAV via its user interface. As a specific example, an operator may use the access system 302 to dispatch a UAV 304 to a target location. The UAV 304 may then autonomously navigate to the general area of the target location. At this point, the operator may use the access system 302 to take control of the UAV 304 and navigate the UAV to the target location (e.g., to a particular person to whom a payload is being transported). Other examples of remote operation of a UAV are also possible.

In an illustrative embodiment, the UAVs 304 may take various forms. For example, each of the UAVs 304 may be a UAV such as those illustrated in FIG. 1, 2, 3, or 4. However, UAV system 300 may also utilize other types of UAVs without departing from the scope of the invention. In some implementations, all of the UAVs 304 may be of the same or a similar configuration. However, in other implementations, the UAVs 304 may include a number of different types of UAVs. For instance, the UAVs 304 may include a number of types of UAVs, with each type of UAV being configured for a different type or types of payload delivery capabilities.

The UAV system 300 may further include a remote device 306, which may take various forms. Generally, the remote device 306 may be any device through which a direct or indirect request to dispatch a UAV can be made. (Note that an indirect request may involve any communication that may be responded to by dispatching a UAV, such as requesting a package delivery). In an example embodiment, the remote device 306 may be a mobile phone, tablet computer, laptop computer, personal computer, or any network-connected computing device. Further, in some instances, the remote device 306 may not be a computing device. As an example, a standard telephone, which allows for communication via plain old telephone service (POTS), may serve as the remote device 306. Other types of remote devices are also possible.

Further, the remote device 306 may be configured to communicate with access system 302 via one or more types of communication network(s) 308. For example, the remote device 306 may communicate with the access system 302 (or a human operator of the access system 302) by communicating over a POTS network, a cellular network, and/or a data network such as the Internet. Other types of networks may also be utilized.

In some embodiments, the remote device 306 may be configured to allow a user to request delivery of one or more items to a desired location. For example, a user could request UAV delivery of a package to their home via their mobile phone, tablet, or laptop. As another example, a user could request dynamic delivery to wherever they are located at the time of delivery. To provide such dynamic delivery, the UAV system 300 may receive location information (e.g., GPS coordinates, etc.) from the user's mobile phone, or any other device on the user's person, such that a UAV can navigate to the user's location (as indicated by their mobile phone).

In an illustrative arrangement, the central dispatch system 310 may be a server or group of servers, which is configured to receive dispatch messages requests and/or dispatch instructions from the access system 302. Such dispatch messages may request or instruct the central dispatch system 310 to coordinate the deployment of UAVs to various target locations. The central dispatch system 310 may be further configured to route such requests or instructions to one or more local dispatch systems 312. To provide such functionality, the central dispatch system 310 may communicate with the access system 302 via a data network, such as the Internet or a private network that is established for communications between access systems and automated dispatch systems.

In the illustrated configuration, the central dispatch system 310 may be configured to coordinate the dispatch of UAVs 304 from a number of different local dispatch systems 312. As such, the central dispatch system 310 may keep track of which UAVs 304 are located at which local dispatch systems 312, which UAVs 304 are currently available for deployment, and/or which services or operations each of the UAVs 304 is configured for (in the event that a UAV fleet includes multiple types of UAVs configured for different services and/or operations). Additionally or alternatively, each local dispatch system 312 may be configured to track which of its associated UAVs 304 are currently available for deployment and/or are currently in the midst of item transport.

In some cases, when the central dispatch system 310 receives a request for UAV-related service (e.g., transport of an item) from the access system 302, the central dispatch system 310 may select a specific UAV 304 to dispatch. The central dispatch system 310 may accordingly instruct the local dispatch system 312 that is associated with the selected UAV to dispatch the selected UAV. The local dispatch system 312 may then operate its associated deployment system 314 to launch the selected UAV. In other cases, the central dispatch system 310 may forward a request for a UAV-related service to a local dispatch system 312 that is near the location where the support is requested and leave the selection of a particular UAV 304 to the local dispatch system 312.

In an example configuration, the local dispatch system 312 may be implemented as a computing system at the same location as the deployment system(s) 314 that it controls. For example, the local dispatch system 312 may be implemented by a computing system installed at a building, such as a warehouse, where the deployment system(s) 314 and UAV(s) 304 that are associated with the particular local dispatch system 312 are also located. In other embodiments, the local dispatch system 312 may be implemented at a location that is remote to its associated deployment system(s) 314 and UAV(s) 304.

Numerous variations on and alternatives to the illustrated configuration of the UAV system 300 are possible. For example, in some embodiments, a user of the remote device 306 could request delivery of a package directly from the central dispatch system 310. To do so, an application may be implemented on the remote device 306 that allows the user to provide information regarding a requested delivery, and generate and send a data message to request that the UAV system 300 provide the delivery. In such an embodiment, the central dispatch system 310 may include automated functionality to handle requests that are generated by such an application, evaluate such requests, and, if appropriate, coordinate with an appropriate local dispatch system 312 to deploy a UAV.

Further, some or all of the functionality that is attributed herein to the central dispatch system 310, the local dispatch system(s) 312, the access system 302, and/or the deployment system(s) 314 may be combined in a single system, implemented in a more complex system, and/or redistributed among the central dispatch system 310, the local dispatch system(s) 312, the access system 302, and/or the deployment system(s) 314 in various ways.

Yet further, while each local dispatch system 312 is shown as having two associated deployment systems 314, a given local dispatch system 312 may alternatively have more or fewer associated deployment systems 314. Similarly, while the central dispatch system 310 is shown as being in communication with two local dispatch systems 312, the central dispatch system 310 may alternatively be in communication with more or fewer local dispatch systems 312.

In a further aspect, the deployment systems 314 may take various forms. In general, the deployment systems 314 may take the form of or include systems for physically launching one or more of the UAVs 304. Such launch systems may include features that provide for an automated UAV launch and/or features that allow for a human-assisted UAV launch. Further, the deployment systems 314 may each be configured to launch one particular UAV 304, or to launch multiple UAVs 304.

The deployment systems 314 may further be configured to provide additional functions, including for example, diagnostic-related functions such as verifying system functionality of the UAV, verifying functionality of devices that are housed within a UAV (e.g., a payload delivery apparatus), and/or maintaining devices or other items that are housed in the UAV (e.g., by monitoring a status of a payload such as its temperature, weight, etc.).

In some embodiments, the deployment systems 314 and their corresponding UAVs 304 (and possibly associated local dispatch systems 312) may be strategically distributed throughout an area such as a city. For example, the deployment systems 314 may be strategically distributed such that each deployment system 314 is proximate to one or more payload pickup locations (e.g., near a restaurant, store, or warehouse). However, the deployment systems 314 (and possibly the local dispatch systems 312) may be distributed in other ways, depending upon the particular implementation. As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, the UAV system 300 may include or have access to a user-account database 316. The user-account database 316 may include data for a number of user accounts, and which are each associated with one or more person. For a given user account, the user-account database 316 may include data related to or useful in providing UAV-related services. Typically, the user data associated with each user account is optionally provided by an associated user and/or is collected with the associated user's permission.

Further, in some embodiments, a person may be required to register for a user account with the UAV system 300, if they wish to be provided with UAV-related services by the UAVs 304 from UAV system 300. As such, the user-account database 316 may include authorization information for a given user account (e.g., a user name and password), and/or other information that may be used to authorize access to a user account.

In some embodiments, a person may associate one or more of their devices with their user account, such that they can access the services of UAV system 300. For example, when a person uses an associated mobile phone to, e.g., place a call to an operator of the access system 302 or send a message requesting a UAV-related service to a dispatch system, the phone may be identified via a unique device identification number, and the call or message may then be attributed to the associated user account. Other examples are also possible.

V. Browsing Available Items for Delivery

Figure 4B:
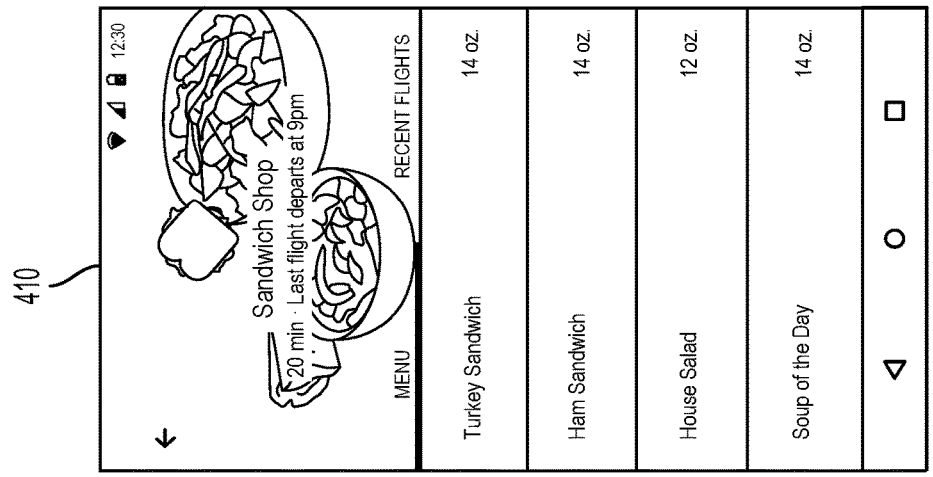
FIG. 4B is an illustration of an interface for placing a UAV transport request, according to an example embodiment.
Figure 4A:
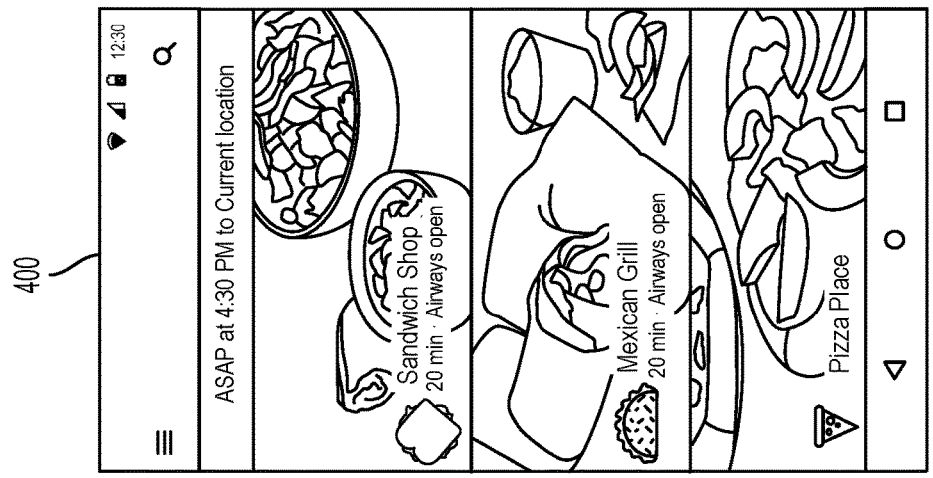
FIG. 4A is an illustration of an interface for placing a UAV transport request, according to an example embodiment.

As discussed above, a user may submit a transport request via a remote device (e.g., a smart phone, laptop, personal computer, or any other client computing device), and a UAV system may responsively deliver one or more items to a target location based on the transport request. In order to facilitate placing the transport request, a client computing device may provide an interface for browsing and selecting items available for UAV delivery. FIGS. 4A-4C illustrate examples of such an interface, and while the illustrated examples are related to UAV delivery of food items, other examples may relate to UAV delivery of various other items or goods.

FIG. 4A illustrates an example interface 400 for browsing and selecting a vendor (e.g., a restaurant, store, etc.). As shown, interface 400 includes a list of available restaurants 402 that provide one or more food items available for UAV delivery. The list of available restaurants 402 may be based on a desired delivery time and location. For instance, interface 400 shows a list of restaurants 402 with one or more food items available to be delivered around 4:30 PM to the user's current location, which may be determined, for instance, based on a GPS receiver of the client computing device. A restaurant may be included or excluded from the list 402 based on its proximity to the target delivery location, an expected preparation time of a food item, an expected transit time from the restaurant to the target delivery location, and/or an availability of UAVs to the restaurant. Other factors may be also be considered.

For each restaurant included in the list, interface 400 may display a restaurant name (e.g., "Sandwich Shop," "Mexican Grill," "Pizza Place"), an expected delivery time, and a status of the availability of UAVs to deliver one or more food items from the restaurant (e.g., displaying "airways open" for a restaurant that is associated with one or more UAVs available to deliver). Other information associated with each restaurant may be displayed as well, including but not limited to a closing time for each restaurant (e.g., displaying "last flight departs at 9 pm" for a restaurant that closes at 9 pm).

Through interface 400, the user may select one of the available restaurants, and the client computing device may provide another interface for selecting one or more food items from the selected restaurant, as shown by example interface 410 in FIG. 4B. For instance, in response to selecting "Sandwich Shop" through interface 400, interface 410 may display a menu that includes a list of food items provided by the Sandwich Shop. In some examples, the displayed menu may be limited to only include items that are available for UAV delivery. Such available items may be determined based on a weight, a size, a temperature, a container, or a fluidity of a particular food item. Other characteristics of a food item may be relevant as well.

Further, while the user is selecting one or more items for UAV delivery through interface 410, the client computing device may consider an overall size and/or weight of the selected items. For instance, the device may determine that the selected items exceed a predetermined size or weight threshold (e.g., a size or weight too large to be delivered by a UAV), and the device may indicate this to the user (e.g., through interface 410). The user may then de-select one or more items until the device determines that the size and/or weight thresholds are not exceeded. In some examples, interface 410 may indicate a weight associated with each food item as well as the maximum threshold weight in order to help the user determine which food items to select or not select.

Alternatively or additionally, in response to detecting that the user has selected various items having a total weight that exceeds a weight limit of a single UAV, interface 410 may indicate that delivery will require multiple UAVs. This may result in greater fees and/or increased delivery times, so interface 410 may provide the user with an option to approve the multi-UAV delivery or modify the order to reduce the total order weight below the weight limit of a single UAV. If the user approves the multi-UAV delivery, then the selected items may be divided amongst a number of UAVs and delivered in multiple flights.

VI. Transport Request Process and Interface

Figure 5:
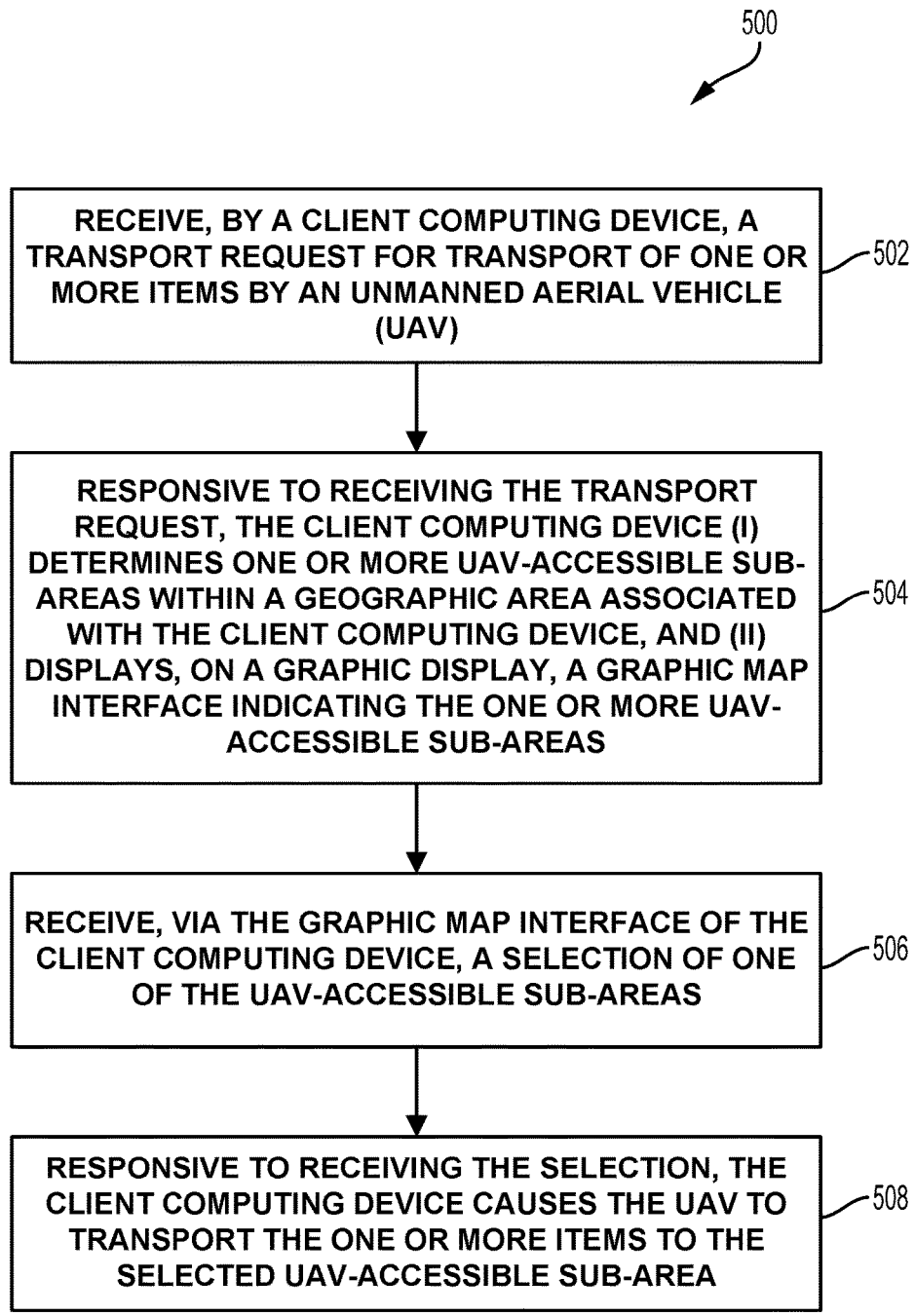
FIG. 5 is a flowchart of a method for placing a UAV transport request, according to an example embodiment.

FIG. 5 is a flow chart of an example method 500 that could be used to place a UAV transport request. The example method 500 may include one or more operations, functions, or actions, as depicted by one or more of blocks 502, 504, 506, and/or 508, each of which may be carried out by any of the devices or systems disclosed herein; however, other configurations could also be used.

Further, those skilled in the art will understand that the flow chart described herein illustrates functionality and operation of certain implementations of example embodiments. In this regard, each block of the flow chart may represent a module, a segment, or a portion of program code, which includes one or more instructions executable by a processor for implementing specific logical functions or steps in the process. The program code may be stored on any type of computer readable medium, for example, such as a storage device including a disk or hard drive. In addition, each block may represent circuitry that is wired to perform the specific logical functions in the process. Alternative implementations are included within the scope of the example embodiments of the present application in which functions may be executed out of order from that shown or discussed, including substantially concurrently or in reverse order, depending on the functionality involved, as would be understood by those reasonably skilled in the art.

Method 500 begins at block 502, which includes receiving, by a client computing device, a transport request for transport of one or more items by an unmanned aerial vehicle. The client computing device may take various forms, such as a smartphone, a tablet, or a personal computer, and the transport request may include a purchase order of one or more items via an online marketplace. For example, the transport request may include a purchase order of one or more food items from a restaurant as described above by way of FIGS. 4A and 4B.

Method 500 continues at block 504, which includes responsive to receiving the transport request, the client computing device (i) determining one or more UAV-accessible sub-areas within a geographic area associated with the client computing device, and (ii) displaying on a graphic display, a graphic map interface indicating the one or more UAV-accessible sub-areas, as well as at block 506, which includes receiving, via the graphic map interface of the client computing device, a selection of one of the UAV-accessible sub-areas.

Identifying one or more UAV-accessible sub-areas may first involve identifying the geographic area associated with the client computing device. In some examples, the geographic area associated with the client computing device may include an area surrounding the client computing device. In other examples, the geographic area associated with the client computing device may be determined based on user input specifying a target delivery location through an interface of the client computing device.

Figure 6C:
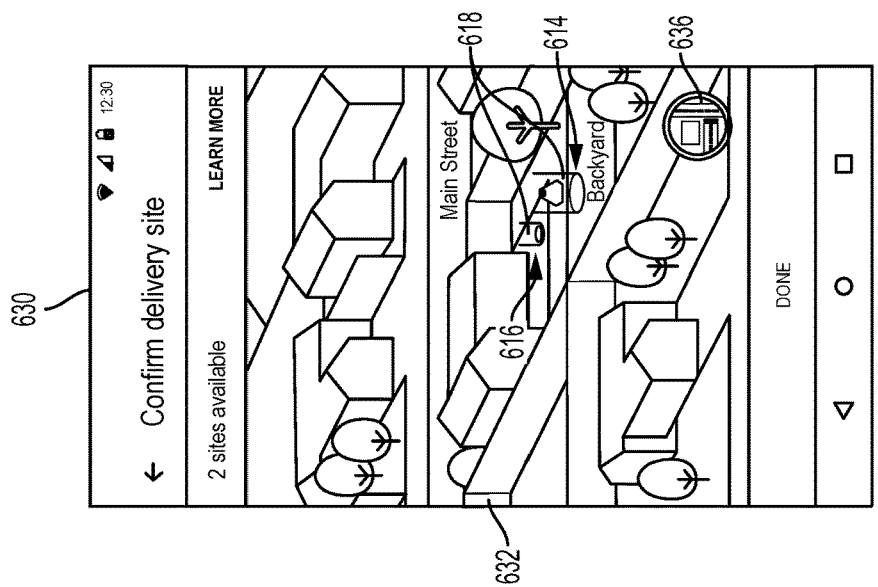
Figure 6B:
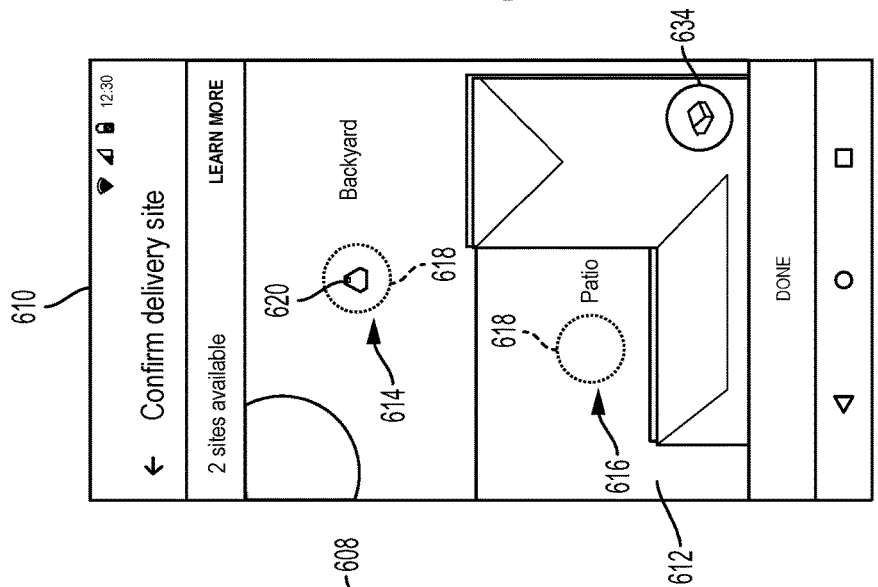
Figure 6A:
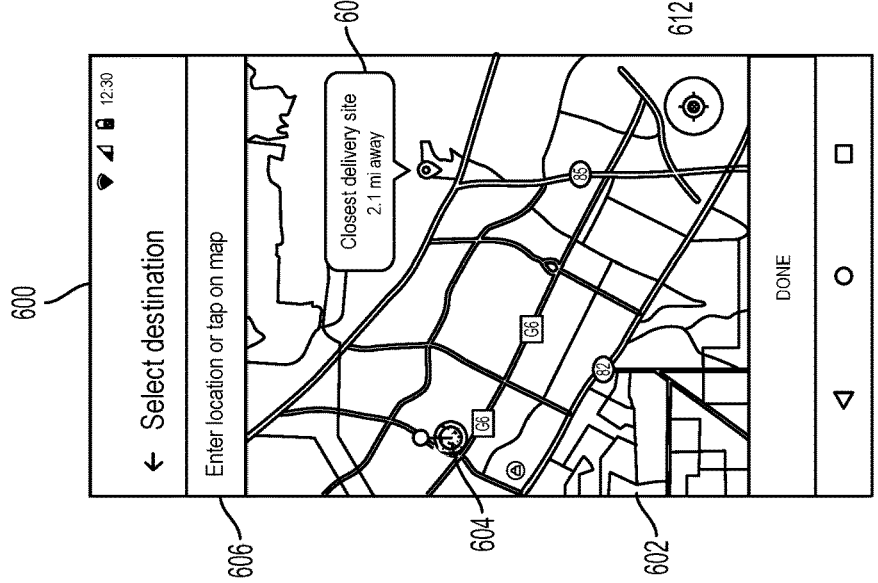

For example, FIG. 6A shows an example interface 600 for selecting a target UAV delivery location. Interface 600 includes a graphic map interface 602. The map interface 602 may include an overhead view of a geographic area. For instance, the geographic area may be an area surrounding a location of the client computing device, which may be indicated by an icon 604 displayed on the map interface 602.

In order to select the target delivery location via interface 600, the user may interact with the map interface 602. For instance, the map interface 602 may be displayed on a touchscreen of the client computing device such that the user may select a desired target delivery location by touching a corresponding location on the map interface 602. In other examples, the user may click on the map interface 602 using a mouse or stylus, or the user may enter an address of the desired target delivery location into an address field 606 of interface 600.

The client computing device may determine whether there are any UAV-accessible delivery locations at or near the desired target delivery location, for instance, by referencing a database of UAV-accessible delivery locations. A particular location may be deemed UAV-accessible if it is determined that a UAV can deliver a payload to that location. For example, a location may be UAV-accessible if it is tether-accessible (i.e., if a UAV can deliver a payload to the location by lowering the payload from the UAV to the ground via a tether). Alternatively, a location may be UAV-accessible if a UAV can land at the location, release a payload, and take off from the location.

A topographical map of a geographic area may be used to determine whether the geographic area includes any UAV-accessible locations. For instance, the topographical map may indicate that a sub-area of the geographic area has an unobstructed vertical path between the ground and the sky. In order for the sub-area to be UAV-accessible, the unobstructed vertical path may be large enough to accommodate the delivery of one or more items by the UAV (e.g., the unobstructed path over the sub-area may be large enough for the UAV to lower an item to the ground via a tether and/or large enough for the UAV to land and take off). In some examples, in order for the sub-area to be UAV-accessible, the unobstructed vertical path may cover an area on the ground equal to or larger than a circular area having a diameter of three meters. Other examples are possible as well.

Further, the topographical map may indicate one or more surface features of a sub-area of the geographic area. For instance, the sub-area may include a water surface feature (e.g., a lake, pond, river, swimming pool, etc.), a ground surface feature (e.g., dirt, grass, plants, concrete, asphalt, etc. located at ground level), or a building surface feature (e.g., a house, garage, shed, apartment, condo, commercial building, etc.). A particular sub-area may or may not be UAV-accessible based on its surface features. For instance, in examples where a UAV is delivering a food item, a sub-area having a water feature may not be UAV-accessible because the water feature may damage the food item. Similarly, a sub-area having a building feature may not be UAV-accessible because delivering the food item to the roof of a building may lead to a poor user experience.

In some examples, in addition to or in the alternative to using a topographical map to determine surface features of a geographic area, various image processing techniques may be applied to a satellite image of a geographic area to determine its surface features. For example, image processing may be applied to the image to determine that a particular surface of a geographic area includes grass, concrete, asphalt, gravel, water, plants, building structures, etc. Further, image processing may be applied to the image to identify three-dimensional characteristics of the surface features. Projective geometry, for instance, may be used to determine a three-dimensional shape of one or more surface features in a two-dimensional satellite image. A sub-area of the geographic area may thus be identified as UAV-accessible based on a three-dimensional shape of one or more surface features depicted in an image of the geographic area.

Further, a sub-area of the geographic area may be identified as UAV-accessible based on various onboard sensors of a UAV. As discussed above, a UAV may include one or more downward-facing cameras (e.g., as part of an optical flow navigational system). These cameras may capture an image and/or video of an area below the UAV. Based on the captured image and/or video, a computing system of the UAV may determine one or more surface features of the area (e.g., whether the area includes water, earth, a building, or some other feature) The computing system may further determine, based on the captured image and/or video, whether the area includes an unobstructed path between the surface feature (e.g., the ground, the roof of a building, etc.) and the sky. Alternatively or additionally, the UAV may include a LIDAR system for detecting the environment around the UAV to determine whether an area is UAV-accessible. Other examples are possible as well.

In some examples, a map of property lines for a geographic area may alternatively or additionally be used to determine whether the geographic area includes any UAV-accessible locations, and a particular sub-area within the geographic area may or may not be UAV-accessible based on its proximity to one or more property lines. For instance, if the user specifies his or her home as the target delivery location, it may be desirable to avoid delivering the food item to the user's neighbor's property (e.g., to avoid disputes between neighbors, to ensure delivery to the correct address, etc.). Thus, in some examples, a sub-area may not be UAV-accessible if it is located within three meters of a property line.

In further examples, a particular location may or may not be designated as UAV-accessible based on whether the location includes a hazard (i.e., whether the location is a safe location for a person or a UAV to occupy). For example, a roadway may provide an unobstructed vertical path to the sky; however, it would be unsafe for a UAV to land or otherwise deliver a payload to the surface of a roadway or for a person to retrieve the payload from the roadway. Various other locations may also not be designated as UAV-accessible based on safety concerns, such as construction sites, railways, bridges, etc.

Additionally, a weather condition or other environmental condition of a geographic area may be considered in determining whether it includes a UAV-accessible location. For example, when an area is experiencing strong winds, a location within the area may not be deemed UAV-accessible, or, alternatively, in order to be UAV-accessible, the location may need to include a larger unobstructed path between the ground and the sky (e.g., providing a larger clearance from trees, buildings, or other objects that may emit potentially damaging debris in windy conditions). Other factors may be taken into account as well, including, but not limited to, an extent of rainfall, snow, hail, sleet, or lightning at a particular location. As such, a particular location may be dynamically identified as UAV-accessible based on various weather and/or environmental conditions.

In accordance with the above examples, a number of UAV-accessible sub-areas associated with a geographic area may be determined and stored in a database (e.g., by storing GPS coordinates for each UAV-accessible sub-area). Referring back to FIG. 6A, the client computing device may refer to the database of UAV-accessible sub-areas to determine whether there are any UAV-accessible sub-areas at or near the desired target delivery location selected by the user. If there are no UAV-accessible sub-areas within a threshold distance of the selected delivery location, then interface 600 may display an indication as such and/or may display an indication 608 of the nearest UAV-accessible sub-area. Alternatively, if there are one or more UAV-accessible sub-areas at or near the selected delivery location, then the client computing device may display a more detailed graphic map interface for selecting one of the UAV-accessible sub-areas. Examples of such an interface are shown in FIGS. 6B and 6C.

FIG. 6B illustrates an example interface 610 for selecting a target UAV delivery location. Interface 610 includes a graphic map interface 612 displaying an overhead view of a geographic area. As mentioned above, the geographic area depicted in map interface 612 may represent a portion of the geographic area depicted in map interface 602. The overhead view may be of a real estate property, such as a particular residence, business, park, municipal building, or some other location that may be selected via interface 600 (e.g., by interacting with map interface 602 or by inputting an address of the location).

In one example, a user may select via interface 600 his or her home as the target delivery location, and map interface 612 may display an overhead view depicting one or more UAV-accessible delivery locations at or near the user's home. For instance, as depicted in FIG. 6B, the UAV-accessible delivery locations near the user's home may include a backyard location 614 and a patio location 616, and these delivery locations may be indicated via map interface 612. In other examples, there may be more or fewer UAV-accessible delivery locations than those illustrated, and map interface 612 may display more or fewer UAV-accessible delivery locations in various locations, including the backyard, patio, and/or other areas (e.g., front yard, driveway, porch, etc.).

Map interface 612 may display the UAV-accessible delivery locations in various manners. For instance, map interface 612 may display one or more graphics 618 associated with each UAV-accessible delivery location. The graphics 618 may indicate a boundary of each delivery location. For instance, in examples where a UAV-accessible delivery location comprises a circular area having an unobstructed vertical path to the sky, the graphic 618 may include a circle superimposed on the circular area. Other shapes or arrangements are possible as well.

Further, map interface 612 may display a name of each UAV-accessible delivery location. For instance, map interface 612 may display the name "Backyard" near the indicated backyard delivery location 614 and the name "Patio" near the indicated patio delivery location 616. In examples where map interface 612 displays different or additional delivery locations, map interface 612 may also display corresponding names for each displayed delivery location (e.g. "Front Yard," "Driveway," "Porch," etc.).

In some examples, the names of the UAV-accessible delivery locations may be specified by a user (e.g., by inputting the names via interface 610). For instance, the user may determine that the backyard delivery location 614 is located in the user's backyard and responsively label the location as "Backyard." In other examples, the names of the UAV-accessible delivery locations may be determined by applying image processing techniques to satellite images. For instance, as discussed above, various image processing techniques may be applied to a satellite image to determine that a particular surface of a geographic area includes grass, concrete, asphalt, gravel, water, plants, building structures, etc. Based on the relative position of the determined surface features, identities and/or names may be associated with particular areas. As an example, a grass area may be identified as a backyard or a concrete area may be identified as a patio based on their relative locations to a building structure. Other examples are possible as well.

Of the displayed UAV-accessible delivery locations, a user may select one (e.g., via touchscreen or mouse input) as a target delivery location. Interface 610 may provide a visual indication of the selected delivery location. For instance, as depicted in FIG. 6B, responsive to receiving a selection of the backyard delivery location 614, interface 610 may display the graphic 618 of the backyard delivery location 614 in a particular color that is different from the unselected patio delivery location 616. Further, interface 610 may display an icon 620 overlaid on the selected backyard delivery location 614. While the icon 620 is depicted as an aerodynamically shaped package having a handle for attaching to a UAV, the icon 620 may take various other forms as well.

While map interface 612 displays an overhead view of the geographic area selected via interface 600, FIG. 6C illustrates an example interface 630 that includes a graphic map interface 632 displaying an oblique view of the geographic area. A user may access interface 630, for instance, by selecting an oblique view button 634 via interface 610. Similarly, a user may access interface 610 by selecting an overhead view button 636 via interface 630.

Map interface 632 may display an oblique view of the same or similar geographic area and the same or similar UAV-accessible delivery locations as those displayed by map interface 612. For instance, as illustrated, map interface 632 displays an oblique view of the user's home that was selected via interface 600.

Map interface 632 may further display the available UAV-accessible delivery locations near the user's home, which may include the backyard location 614 and the patio location 616. The UAV-accessible delivery locations may be indicated by graphics 618 displayed by interface 630. As illustrated, the graphics 618 may include a boundary of the UAV-accessible delivery locations, such as an ellipse or circle superimposed on the ground. The graphics 618 may further include one or more lines extending from the boundary (e.g., the ellipse or circle) upwards towards the sky, and the lines may fade from opaque at the boundary to transparent closer to the sky. In this manner, the graphics 618 may appear as holographic cylinders that fade into transparency as they extend above the ground.

Similar to map interface 612, a user may select one of the UAV-accessible delivery locations displayed via map interface 632 as a target delivery location. Interface 630 may provide a visual indication of the selected delivery location, for instance, by displaying the graphic 618 of the selected delivery location in a particular color that is different from the unselected delivery location and/or by displaying an icon (e.g., a UAV delivery package) overlaid on the selected delivery location.

Referring next to FIG. 6D, an example interface 640 is shown for selecting a target delivery time and location. Interface 640 may include a delivery time field 642 for selecting a target delivery time. For instance, a user may select a time corresponding to immediate or as soon as possible delivery (e.g., on the next available UAV), or the user may select a time corresponding to some time in the future. As illustrated, the time field 642 may take the form of a dropdown menu, but other examples are possible as well.

In some examples, the time field 642 may allow selection of a location-based future delivery. In location-based future delivery, rather than initiating or completing a delivery at a user-specified time, the delivery may be carried out based on a user-specified location. For example, if the user chooses location-based future delivery and selects the user's home as the destination, a UAV system may initiate the delivery once it is determined that the user has arrived at his or her home (e.g., based on GPS coordinates of the client computing device). Alternatively, the UAV system may predict a time when the user will arrive at his or her home (e.g., based on a calendar associated with the user, a current location of the user, current and/or prior movement patterns of the user, etc.), and carry out the delivery request such that the delivery is completed at the predicted time.

Interface 640 may further include a list 644 of available UAV-accessible delivery locations, and a user may select a target delivery location from the delivery location list 644. The list 644 may identify the locations by an address and/or a name associated with each location. For instance, a user may specify that a particular address is associated with the user's home, and the list 644 may identify that address by the name "Home." Other examples are possible as well.

In some examples, the list 644 may be populated based on the user's order history and/or user preferences associated with an account of the user. For instance, the list 644 may include recently selected delivery locations, frequently selected delivery locations, and/or delivery locations identified as preferred by the user. Alternatively or additionally, the delivery location list 644 may identify one or more UAV-accessible delivery locations within a threshold distance of the user (e.g., based on GPS coordinates of the client computing device) and/or within a threshold distance of a location specified by the user (e.g., via interface 600).

Further, a user may select from the list 644 a current location of the client computing device as the target delivery location. Such a selection may cause the UAV to deliver its payload to the UAV-accessible delivery location that is nearest to the current location of the client computing device.

Referring next to FIG. 6E, an example interface 650 is shown for placing a UAV delivery request. Interface 650 may include a price field 652, a payment field 654, and a destination field 656. The price field 652 may display a total price of the UAV delivery request, which may be itemized to display a cost of the ordered items, a tax, and any delivery fees or other fees. The payment field 654 may provide an interface for a user to input payment information, such as a credit/debit card number. The destination field 656 may identify the selected target delivery location (e.g., by an address and/or a name associated with the selected target delivery location). In some examples, the selected target delivery location may be a delivery location selected through interface 610 and/or 630. In other examples, the selected target delivery location may be a default location based on the user's order history (e.g., most recent or most frequent delivery location) user preferences associated with an account of the user (e.g., a location identified as preferred by the user).

Referring back to FIG. 5, method 500 continues at block 508, which includes responsive to receiving a selection of one of the UAV-accessible sub-areas, the client device causes the UAV to transport one or more items to the selected UAV-accessible sub-area. For instance, once a user has placed an order for one or more goods (e.g., via one or more of the interfaces depicted in FIGS. 4A and 4B) and selected a target delivery location (e.g., via one or more of the interfaces depicted in FIGS. 6A-6E), a UAV system, such as UAV system 300, may dispatch one or more UAVs to the target delivery location. A payload package containing the ordered goods may be attached to the UAV, and the UAV may navigate to the target delivery location where the payload may be delivered by the UAV (e.g., by lowering the payload to the ground via a tether) and retrieved by the user.

Figure 7A:
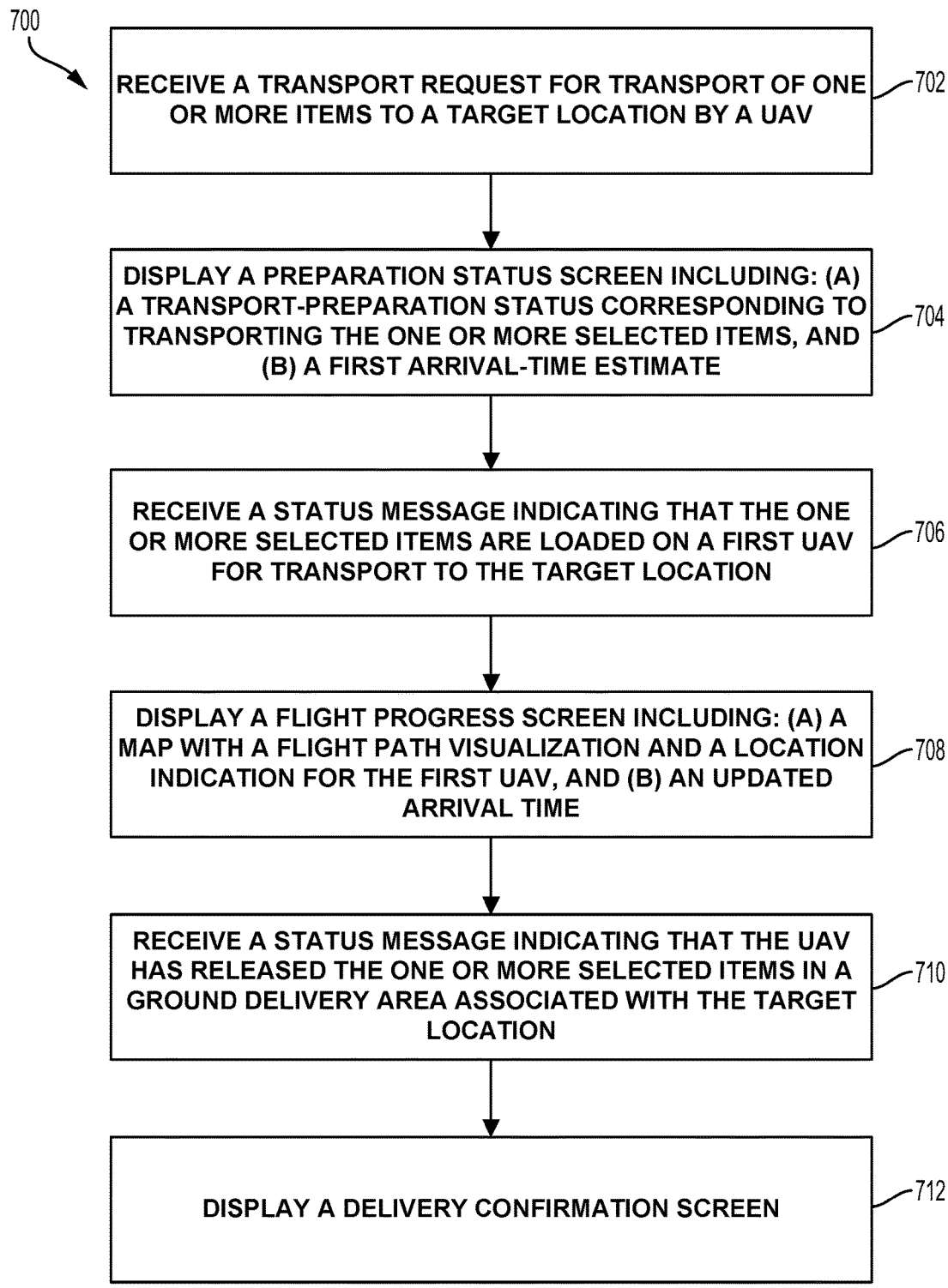
FIGS. 7A and 7B are flow charts illustrating methods for providing a client-facing application for a UAV transport service, according to an example embodiment.
Figure 7B:
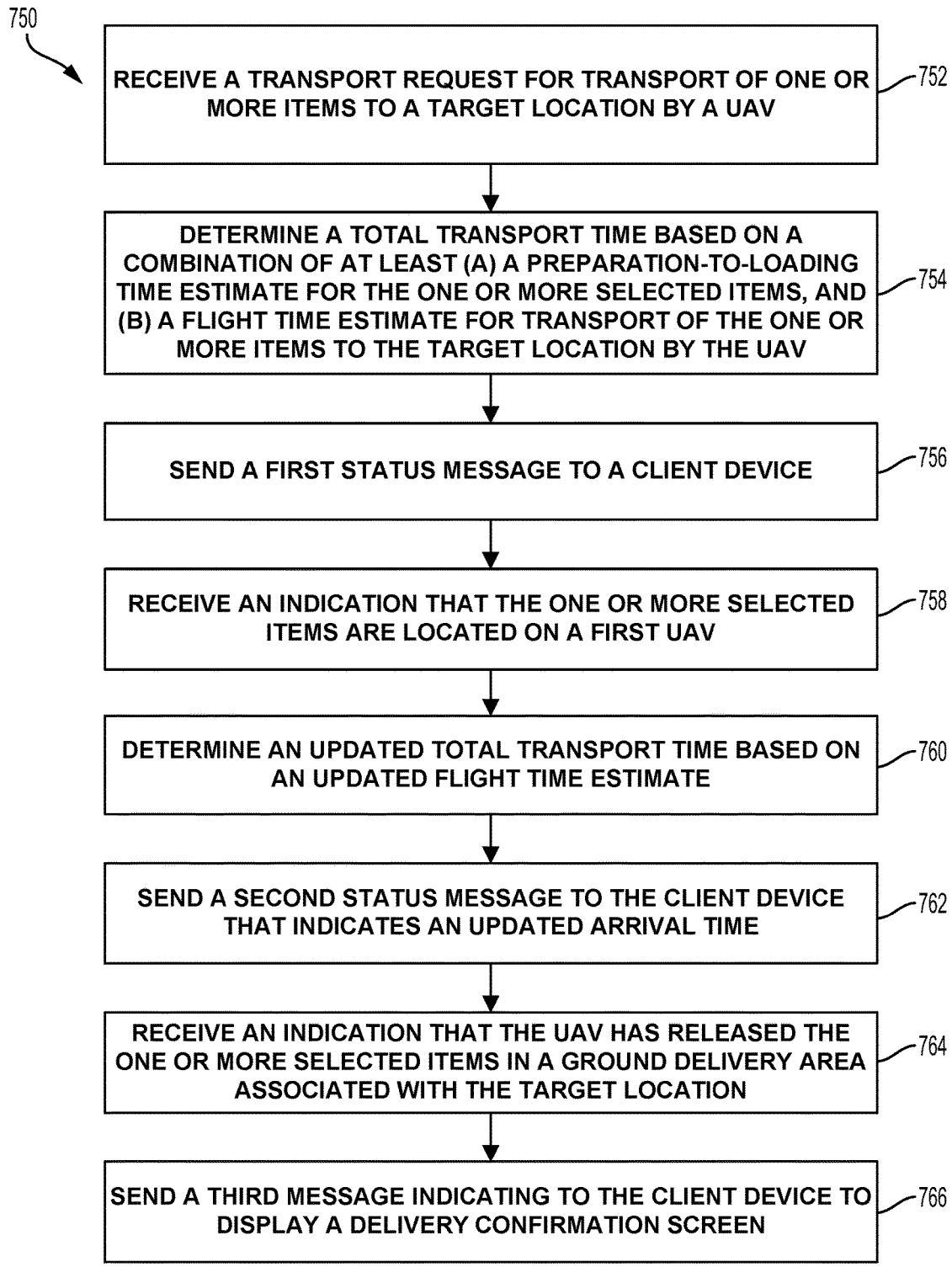

VII. Interface Features for Tracking Fulfillment Process for UAV Transport Request A. Status Update Methods FIGS. 7A and 7B are flow charts illustrating methods for providing a client-facing application for a UAV transport service, according to an example embodiment. In particular, FIG. 7A illustrates a method 700 that can be implemented by a client device to provide status information and related functionality during fulfillment of a UAV transport request. Correspondingly, FIG. 7B illustrates a method 750 that may be implemented by a UAV transport service provider's server system to facilitate the functionality of a client-facing application shown in FIG. 7A. (Of course, it should be understood that the client-device functionality of method 700 is not required in the context of the server-side method illustrated in FIG. 7B.)

Referring to FIG. 7A in greater detail, method 700 involves a client device receiving a transport request for transport of one or more items to a target location by a UAV, as shown by block 702. This request may be received via a client-facing application as described above, or in another manner. Responsive to receipt of the transport request, the client device displays a preparation status screen including: (a) a transport-preparation status corresponding to transport the one or more selected items, and (b) a first arrival-time estimate, as shown by block 704. (Examples of preparation status screens are provided below with reference to FIGS. 8B and 8C.)

Next, the client device receives a status message indicating that the one or more selected items are loaded on a first UAV for transport to the target location, as shown by block 706. In response, the client device displays a flight progress screen including: (a) a map with a flight path visualization and a location indication for the first UAV, and (b) an updated arrival time, as shown by block 708. The updated arrival time is based an updated flight time estimate for transport of the requested items by a UAV, which may be determined at or near the time when loading of the items onto the UAV is complete. (Examples of flight progress screens are provided later with reference to FIGS. 8D to 8F.)

Continuing with method 700, the client device may subsequently receive a status message indicating that the UAV has released the one or more selected items in a ground delivery area associated with the target location, as shown by block 710. In response, the client displays a delivery confirmation screen, as shown by block 712. (An example of a delivery confirmation screen is provided later with reference to FIG. 8H.)

Referring now to FIG. 7B, method 750 may be implemented by the server system, in conjunction with the implementation of method 700 by a client device. In particular, the server system may implement method 750 in order to provide the client device with status updates, and other transport-related functionality, which facilitates the client-side application and functionality of method 700.

More specifically, method 750 involves a server system receiving a transport request for transport of one or more items to a target location by a UAV, as shown by block 752. This transport request may be received from a client device, which in turn may have received the request via a client-facing application, using techniques such as those described above. The transport request received at block 752 may also originate from another source, which implements a different technique to initiate the request.

In response to receipt of the transport request, the server system determines a total transport time, as shown by block 754. The total transport time is determined based on a combination of at least (a) a preparation-to-loading time estimate for the one or more selected items, and (b) a flight time estimate for transport of the one or more items to the target location by a UAV. Techniques for determining total transport time are discussed in greater detail in section VIII(C) below.

After determining the total transport time, the server system sends a first status message to a client device, as shown by block 756. The first status message includes: (a) a transport-preparation status for the one or more selected items, and (b) an arrival time corresponding to the total transport time. As such, the first status message may serve as an indication to the client device to display a preparation status screen indicating the transport-preparation status and the arrival time. (The first status message may thus be utilized by the client device to carry out block 704 of method 700.)

Subsequently, the server system receives an indication that the one or more selected items are loaded on a first UAV, and ready for transport to the target location, as shown by block 758. In response, the server system: (i) determines an updated total transport time, as shown by block 760, and (ii) sends a second status message to the client device, which indicates an updated arrival time, as shown by block 762. The updated total transport time may be determined by first determining an updated flight time estimate, and then determining a corresponding arrival time. Since the items are loaded at this point in time, the transport preparation phase may be considered complete, such that the updated total transport time preparation-to-loading time estimate.

Since the second status message indicates the requested items are loaded on the UAV, this indicates that the items are ready for transport (or perhaps that the UAV flight has just begun). Accordingly, the second status message may serve as an indication to the client device to display a flight progress screen. For example, the second status message may serve as an indication to display a screen in accordance with block 708 of method 700 (e.g., a screen including (a) a map with a flight path visualization and a location indication for the UAV, and (b) the updated arrival time indicated in the second status message).

Continuing now with method 750, the server system may subsequently receive an indication that the UAV has released the one or more selected items in a ground delivery area associated with the target location, as shown by block 764. It is noted the release of the selected items may involve separation from the tether, or any other type of separation from the UAV, such that the selected items are available for pickup at the target location. Alternatively the release of the selected items may not involve separation from the UAV, such an embodiment where a UAV lands at the target location and powers off such that the user can take the selected items off the UAV, or as in an embodiment where the user removes the selected items from the tether while the UAV is hovering above.

In response to determining the selected items have been released in a ground delivery area, the server system may send a third message indicating to the client device to display a delivery confirmation screen, as shown by block 766. As such, the third status message may provide the indication to the client device at block 710 of method 700, which prompts the client device to display a delivery confirmation screen at block 712 of method 700.

Methods 700 and 750 involve status updates at least three times during the fulfillment of a UAV transport request. Specifically, status updates are provides when the order is initially confirmed, when pre-flight tasks are complete and the item(s) are loaded on the UAV and the UAV's flight is about to begin, and when delivery is completed such that the ordering party can retrieve the requested items at the target location. It should be understood, however, that additional status updates may be provided at various points during the pre-flight and/or flight phase (e.g., in response to various events in the fulfillment process).

B. Phases of UAV Transport Process

As noted above, the fulfillment process for a UAV transport request may be characterized by two primary phases: (i) a pre-flight phase and (ii) a flight phase. Further, status information and delivery-related functionality may be designed around these two primary phases of the UAV transport process.

Generally, the pre-flight phase may include tasks such as order processing, item retrieval, item preparation and packaging, transport from packaging location to UAV loading area, and/or loading time, among others. In the specific example of food delivery, the pre-flight phase may include tasks such as food preparation (e.g., cooking) and food packaging, among other possibilities. Other examples are of course possible.

To facilitate status updates and improve delivery timing estimates, the pre-flight phase may be conceptually divided into a number of defined sub-phases. In an example embodiment, the pre-flight sub-phases may generally be organized around different tasks required to prepare and load requested items onto a UAV for transport. For instance, the pre-flight phase may include: an order-processing sub-phase, an item-preparation sub-phase, and/or a loading sub-phase, among other possibilities. As described later in reference to FIGS. 8A to 8, a server system may send updates, and a client-facing application may update displayed information and available functionality, according to the current sub-phase of a particular UAV delivery. Further, by considering timing for certain sub-phases individually, a service provider system may be able to improve the accuracy of the preparation-to-loading time estimate for the entire pre-flight phase.

The flight phase may also be conceptually divided into sub-phases. In an example embodiment, these sub-phases may be defined, at least in part, to correspond to certain portions of the UAV flight where status updates are deemed appropriate. For example, the flight phase may include a flight-initiation sub-phase, a mid-flight sub-phase, an arrival sub-phase, an in-progress delivery sub-phase, and a delivery-complete sub-phase. Additional details and examples of flight sub-phases are described later in reference to FIG. 8.

C. Dynamically Determining Transport Timing Information

As noted above, method 750 may involve a service-provider system determining timing information related to fulfillment of a transport request by a UAV during item preparation and UAV flight. In particular, the service-provider system may determine a total transport time upon receipt of a UAV transport request, and may update the total transport time to refine the estimated arrival time as the fulfillment process progresses. Herein, the total transport time should be understood to be the amount of time between a current time (e.g., when the total transport time is calculated) and the estimated time that delivery of the requested items is completed (e.g., an estimated arrival time). As such, the service-provider system and/or the client device may calculate total transport time periodically, continuously, and/or in response to various predetermined events (e.g., transitions between phases or sub-phases) during the fulfillment process.

For example, once a transport request (e.g., an order) is placed via an exemplary client application, and received by the server system at block 752 of method 750, the server system may base the determination of a total transport time (e.g., at block 754) based on the combination of timing estimates that are separately determined for two distinct phases of the UAV food delivery process. In particular, the server system may calculate separate time estimates for (i) the pre-flight phase and (ii) the flight phase, and use the combination of these estimates to determine the total transport time.

As a specific example, in the context of UAV food delivery, the delivery service system may estimate timing of the pre-flight phase by calculating a preparation-to-loading time estimate for the specific food items that were ordered. And, for the flight phase, the delivery service system may estimate a flight time for the UAV to transport the food items to the delivery location, and lower the food items to the ground in delivery area via tether. The preparation-to-loading time estimate and the flight time estimate may then be combined to determine the total transport time for UAV delivery of the food items.

In a further aspect, the preparation-to-loading time may include an estimated time for food preparation at the food source (i.e., at the restaurant). This estimate may be based on general knowledge about the type of food ordered and/or the type of restaurant from which the food was ordered. Further, data regarding deliveries that have been made may be aggregated and machine-learning processes may be applied to improve the accuracy with which food type and/or restaurant type factors into the preparation-to-loading time. Additionally, records may be kept for specific restaurants, for specific food items, and/or for specific combinations of food items from specific food sources (or perhaps even combinations of items from multiple food sources). Machine learning processes may likewise be applied to improve the accuracy with which this source-specific information affects the preparation-to-loading time.

Further, while a UAV preferably arrive just as or shortly before the food items are ready to be loaded onto the UAV, this timing may not always be possible. Accordingly, a food delivery service may use data relating to UAV availability and/or flight time to the food source for pickup to more accurately estimate the preparation-to-loading time for a particular order.

The flight time for a particular order may also be calculated using various types of information. For example, the flight time may be determined based on UAV capabilities, UAV traffic on or near the flight path from the food source to the target delivery location, the type area/location where the food items will be delivered, limitations on flight speed trajectory for the particular food items being transported, and/or priority of the particular order, among other possibilities.

As noted above, the pre-flight phase and/or the flight phase of the delivery process may be further divided into various sub-phases. In some implementations, the server system may determine separate timing data for some or all sub-phases in the pre-flight phase, and use the timing data for these sub-phases to determine the total preparation-to-loading. Similarly, the server system may determine separate timing data for some or all sub-phases in the flight phase, and use the timing data for these sub-phases to determine the estimated flight time.

As a specific example, at a time when demand for UAV transport services is high, it may not be possible for a UAV to arrive at the item source location at the earliest time the requested items are ready for loading. In such an embodiment, preparation-to-loading time may be extended to allow time for a UAV to arrive to pick up the items from the source location (e.g., from a restaurant). Further, in such an embodiment, an example method may further involve the server system using a demand indication for UAV transport services to determine a preparation-to-loading time estimate.

If the level of demand is such that an estimated item preparation time is less than an expected arrival time for a UAV at the item source location, then the server system may further send a message to an account associated with the item source location, which indicates the expected arrival time of the UAV at the item source location for item pick-up. In the context of food delivery, the message may further suggest that preparation of the requested food items be delayed so that the items are prepared just in time for (or shortly after) the UAV is expected to arrive for pick-up at the source restaurant. Yet further, the server system may determine an expected item preparation time for the particular food items indicated in the transport request, and based thereon, may include a suggested time at which preparation of the requested food items should begin. Additionally or alternatively, in some embodiments, the server system could make an effort to smooth or ease demand on a kitchen production line when making food preparation suggestions and/or corresponding delivery timing estimates (e.g., by allowing the kitchen 10 minutes to get "ahead" during or just before times of peak demand). Other examples and variations on this specific example are also possible.

In a further aspect, the service provider system may update the estimation of the total transport time (and the corresponding arrival time) throughout the fulfillment process. The updated total transport time may be determined based on the sub-phases of the pre-flight phase and/or flight phase that remain to be completed, at or the time the update is calculated.

D. Example Interface Screens for UAV Transport Status

In accordance with example embodiments, a client-facing application may update a GUI as the transport process progresses through its various phases and/or sub-phases. In some implementations, some or all updates to the GUI may be provided in real-time.

To facilitate such updates, a server may detect when transitions between the various phases and/or sub-phases occur, and send status update messages to the client device associated with the particular UAV transport request. Note that such status update messages may be sent every time a new sub-phase begins, or only sent when some (but not all) sub-phases begin. Further, each time a status update message is sent, the server system may update estimated timing information corresponding to the transport request (e.g., total transport time, estimated arrival time, etc.), and provide the updated transport timing information to the client device. Alternatively, the server system might include updated transport timing information in some, but not all, status messages.

FIGS. 8A to 8H show a sequence of GUI screens that may be displayed by an example client-facing application. These screens may be displayed by a client-facing application as a UAV food delivery process progresses through its various phases and sub-phases. Each screen may include timing estimates determined in accordance with methodology described herein. Further, each screen shown in FIGS. 8A to 8H may include information and/or provide access to functionality related to a current phase and/or sub-phase of the fulfillment process for a UAV transport request. Additionally, the estimated time of arrival (ETA) shown in FIGS. 8A to 8H may be updated frequently (and possibly pushed to the client device in real-time) during the course of the delivery. In so doing, the service-provider system that provides the ETA estimations may utilize data and consider factors as described herein, so as to provide a highly accurate ETA (which will typically become even more accurate as the delivery process progresses).

Note that the example screens shown in FIGS. 8A to 8H characterize certain phases and sub-phases of the UAV food delivery using terminology derived from commercial airline flights, instead of using terminology that is typical for food delivery. By characterizing the phases and sub-phases of the UAV food delivery in terms derived from commercial airline flights an example client-facing application may enhance the user-experience. In particular, since the UAV food delivery process can differ significantly from traditional food delivery processes, such characterization may help users better understand the status of their order by analogizing to a different but familiar context. It should be understood, however, that embodiments in which an application does not include such characterizations are also possible.

i. Illustrative Status Screens for Pre-Flight Phase

Referring now to FIG. 8A, a screen 800 is shown. Screen 800 may be displayed by the client application during an order processing sub-phase. For example, screen 800 may be displayed while waiting for a restaurant to confirm receipt of a UAV transport request for food item(s) and/or while waiting for verification of a payment corresponding to a transport request. Screen 800 includes status information 802. In the illustrated example, the status during the order processing sub-phase is characterized as "confirming flight". Of course, other characterizations of status are also possible during the order processing sub-phase.

Referring now to FIG. 8B, FIG. 8B shows a screen 810 from an example client application for a UAV transport service. Screen 810 may be displayed by the client application during an item-preparation sub-phase of the fulfillment process for a UAV transport request. Screen 810 thus provides an example of preparation status screen, which may be displayed by a client device at block 704 of method 700. In the context of a UAV food delivery application, screen 810 may be displayed while requested food items are being prepared and/or packaged at the restaurant. Screen 810 includes order identification information 811, status information 812, and an arrival time estimate 814 for arrival of the UAV with the requested items at the target location.

In the illustrated example, the status information 812 characterizes the status during the item-preparation sub-phase as "at the gate". Of course, other characterizations of status are also possible during an item-preparation sub-phase.

In a further aspect, the arrival-time estimate 814 may be determined upon confirming the order (and before preparation of items begins). In particular, the arrival-time estimate 814 may be determined based on the current time and an estimate of total transport time determined in accordance with block 754 of method 750. For instance, arrival-time estimate 814 may be based on a total transport time that is determined based on a combination of at least (a) a preparation-to-loading time estimate for the one or more selected items, and (b) a flight time estimate for transport of the one or more items to the target location by a UAV. Thus, at the time screen 810 is displayed, the arrival-time estimate 814 may account for the pre-flight phase and the flight phase. As such, the preparation-to-loading time used to determine estimated timing of the pre-flight phase, and ultimately the arrival time estimate 814, may be determined based on timing estimates for and/or current status of the item-preparation phase.

In another aspect, a service-provider system may update the preparation-to-loading time, such that the client-facing application can update the corresponding arrival-time estimate 814 in screen 810, as item preparation progresses. For example, before preparation of food items begins at a restaurant, the preparation-to-loading time may be calculated based on an estimated preparation time for such food items. The preparation-to-loading time could then be updated as certain food items are prepared. Specifically, when a food item is prepared and ready for loading (or ready for packaging), the preparation-to-loading time may be updated based on the actual time at which the food item was prepared. The total transport time, and the corresponding arrival-time estimate 814, may then be updated according to the updated preparation-to-loading time.

To facilitate such updates in an item-preparation screen 810, a service-provider system may be configured to interface with an item-provider application. Such an item-provider application may be utilized at the food source to provide updates during item preparation, and possibly at other times as well (such as when food items are loaded onto a UAV). As a specific example, an item-provider application may be installed on a restaurant's computing device, and may allow the restaurant to provide update(s) as food item(s) are prepared and ready for loading on a UAV. Other examples and variations on the above-described example are possible.

Referring now to FIG. 8C, FIG. 8C shows a screen 820 from an example client application for a UAV transport service. Screen 820 may be displayed by the client application during a loading sub-phase of the fulfillment process for a UAV transport request. Further, screen 820 includes order identification information 811, status information 822, and an arrival time estimate 824 for arrival of a UAV with the requested items at the target location.

Screen 820 provides an example of loading screen, which may be displayed by a client device in some implementations of method 700 (e.g., after displaying a preparation status screen, and before displaying a screen corresponding to the flight phase). In the context of a UAV food delivery application, screen 820 may be displayed after the requested food items are prepared (e.g., cooked), while the food items are being packaged and loaded at the restaurant. Alternatively, packaging of items may be considered part of the item-preparation sub-phase, such that screen 820 is displayed after the requested food items are prepared and packaged, while the food items are being transported to and loaded onto a UAV for transport to the target location.

In the illustrated example, the status information 822 on loading status screen 820 characterizes the status during the loading sub-phase as "now boarding." Of course, other characterizations of status are also possible during the loading sub-phase.

In a further aspect, the arrival-time estimate 824 for screen 820 may initially be determined after preparation of requested items is completed, and before loading of items begins. (And, in an embodiment where packaging of items is considered part of the loading phase, before packaging begins.) As such, the arrival-time estimate 824 may be based on an updated total transport time, which is determined after an initial determination of total transport time at block 754 of method 750, and before a subsequent update at block 760 of method 750. For instance, arrival-time estimate 824 may be based on a total transport time that is determined based on a combination of at least (a) an updated preparation-to-loading time estimate corresponding to the remaining portion of the pre-flight phase (e.g., the loading phase), and (b) an updated flight time estimate for transport of the one or more items to the target location by a UAV.

In a further aspect, the loading time, and the corresponding arrival-time estimate 824 in screen 820, can be updated as the loading phase progresses. For example, before preparation of food items begins at a restaurant, the preparation-to-loading time may be calculated based on estimated timing for tasks such as transporting the food items from a food preparation location (e.g., a restaurant kitchen) to a UAV pick-up location, packaging items, placing items in packaging, placing items or a package containing the items into a UAV compartment, and/or attaching items or a package containing the items to a UAV (e.g., to a tether), among other possibilities. The loading time estimate could then be updated as certain tasks from the loading phase are completed, to reflect the time remaining in the loading phase. The total transport time, and the corresponding arrival-time estimate 824, may then be updated according to the updated loading time.

To facilitate such updates in a loading screen 820, a service-provider system may be configured to interface with an item-provider application, as noted above. Such an item-provider application may be utilized at the food source (and/or at a UAV pick-up location) to provide updates during item loading, transport to a UAV pick-up location, and/or item packaging. As a specific example, an item-provider application may be installed on a restaurant's computing device (e.g., a mobile phone or tablet), and may allow a restaurant employee to provide update(s) as food item(s) are packaged, transported to a UAV pick-up location for loading, and/or loaded on the UAV. Other examples and variations on the above-described example are possible.

ii. Illustrative Status Screens for Flight Phase

FIG. 8D shows a screen 830 from an example client application for a UAV transport service. Screen 830 includes order identification information 811, status information 832, an arrival time estimate 834 for arrival of a UAV with the requested items at the target location, and a map feature 836 with a flight path visualization 837. Further, screen 830 may be displayed by the client application during a departing (or flight-initiation) sub-phase of the fulfillment process for a UAV transport request. As such, screen 830 provides an example of flight-progress screen, which may be displayed by a client device at block 708 of method 700.

In the illustrated example, the status information 832 characterizes the status during the item-preparation sub-phase as "departing". Of course, other characterizations of status are also possible during the flight-initiation sub-phase of the flight phase.

In the context of a UAV food delivery application, screen 830 may initially be displayed when the service-provider system receives an indication that requested food items are loaded on a UAV (e.g., at block 758 of method 750). Such an indication may be provided by the item source (e.g., by a restaurant) via an item-provider application, and/or by the UAV itself, which may be configured to detect when items are loaded and communicate an indication to this effect to a service-provider system.

In a further aspect, the arrival-time estimate 834 shown in screen 830 may be initially determined upon receipt of the indication that items have been loaded onto the UAV. In particular, the arrival-time estimate 834 may be determined based on the current time and an updated estimate of total transport time determined in accordance with block 760 of method 750. For instance, at block 760, the pre-flight phase may be considered complete, such that the total transport time is based on the estimated flight time to the target location, and possibly a separate time estimate for delivery (e.g., time required to lower the food items to the ground via tether and/or for the UAV to move away from the delivery area). Accordingly, when screen 830 is initially displayed, arrival-time estimate 834 may reflect this updated total transport time estimate.

In a further aspect, as the flight-initiation phase progresses, the flight time estimate, and the corresponding arrival-time estimate 834 displayed in screen 830, may be updated to reflect timing for the remaining portion of the flight-initiation phase (and the remainder of the flight phase). For example, the flight-initiation phase may be defined to include any time the UAV spends on the ground after items are loaded, and a take-off process (e.g., the process of the UAV ascending to a certain altitude). Accordingly, during the flight-initiation phase, the flight time estimate, and the corresponding arrival-time estimate 834, may be updated to reflect the actual take-off time and/or the amount of time it takes for the UAV to ascend to a predetermined altitude (or to fly a certain distance from the item source location).

FIG. 8E shows another screen 840 from an example client application for a UAV transport service. Screen 840 includes order identification information 811, status information 842, an arrival time estimate 844 for arrival of a UAV with the requested items at the target location, and a map feature 846 with a flight path visualization 847. Further, screen 840 may be displayed by the client application during an "en-route" (or mid-flight) sub-phase of the fulfillment process for a UAV transport request. As such, screen 840 provides another example of flight-progress screen, which may be displayed by a client device at block 708 of method 700.

In the illustrated example, the status information 842 characterizes the status during the item-preparation sub-phase as "en route". Of course, other characterizations of status are also possible during the mid-flight sub-phase of the flight phase.

In the context of a UAV food delivery application, screen 840 may initially be displayed when the service-provider system receives an indication that UAV flight has begun, and provides the client-facing application with an indication to this effect. The service-provider system may be provided with such an indication by the item provider (e.g., by a restaurant) via an item-provider application. Additionally or alternatively, such an indication may be provided to the service-provider system by the UAV itself, which may be configured send a message to a service-provider system when a UAV flight begins. Alternatively, a UAV may simply report its location information (e.g., GPS coordinates) to a service-provider system. The service-provider system may then determine that the flight has begun when the reported location information indicates that the first UAV has left the source location, or is more than a predetermined distance from the source location. Further, the service-provider system may consider the mid-flight phase of flight to continue until it determines that the UAV at or within a predetermined distance from the target location.

In a further aspect, the arrival-time estimate 844 shown in screen 840 may be initially determined upon receipt of the indication that UAV flight has begun. In particular, the arrival-time estimate 844 may be determined based on the current time and an updated estimate of total transport time based on an estimate of the remaining flight time and a delivery time estimate. Further, as the UAV's flight to the target location progresses, the flight time estimate, and the corresponding arrival-time estimate 844 displayed in screen 840, may be updated to reflect timing for the remaining portion of the flight.

FIG. 8F shows another screen 850 from an example client application for a UAV transport service. Screen 850 includes order identification information 811, status information 852, an arrival time estimate 854 for arrival of a UAV with the requested items at the target location, and a map feature 856 with a flight path visualization 857. Further, screen 850 may be displayed by the client application during an approach sub-phase of the fulfillment process for a UAV transport request. As such, screen 850 provides another example of flight-progress screen, which may be displayed by a client device at block 708 of method 700.

In the illustrated example, the status information 852 characterizes the status during the approach sub-phase as "final approach—approaching your destination". Of course, other characterizations of status are also possible during the approach sub-phase of the flight phase.

In the context of a UAV food delivery application, screen 850 may initially be displayed when the service-provider system determines or receives an indication that UAV is within a certain predetermined distance from the target location. For instance, such an indication may be provided to the service-provider system by the UAV itself, which may be configured send a message to a service-provider system when the UAV determines it is within a certain predetermined distance from the target location. Alternatively, a UAV may simply report its location information (e.g., GPS coordinates) to a service-provider system, and the service-provider system may use such location reports to determine when the UAV is within a certain predetermined distance from the target location.

In a further aspect, the arrival-time estimate 854 shown in screen 850 may be initially determined upon receipt of the indication that UAV is within a certain predetermined distance from the target location. In particular, the arrival-time estimate 854 may be determined based on the current time and an updated estimate of total transport time, which is determined based on the remaining flight time and a delivery time estimate.

FIG. 8G shows another screen 860 from an example client application for a UAV transport service. Screen 860 includes order identification information 811, status information 862, an arrival time estimate 864 for arrival of a UAV with the requested items at the target location, a graphic map interface 866 showing a delivery area at the target location.

Screen 860 may be displayed by the client application upon arrival of the UAV at the target location, during an in-progress delivery phase of the fulfillment process for a UAV transport request. As such, screen 860 may be considered a delivery status screen, and may displayed by a client device as part of method 700 (e.g., after block 708). In the illustrated example, the status information 862 characterizes the status during the delivery phase as "pulling up to the gate—your food is being lowered". Of course, other characterizations of status are also possible during the approach sub-phase of the flight phase. Further, in some embodiments, the delivery status screen 860 may share some of (or perhaps even all of) the functionality of the screen 610 shown in FIG. 6B.

FIG. 8H shows another screen 870 from an example client application for a UAV transport service. In particular, screen 870 may be displayed by the client application when delivery is complete, and the order is ready to be picked up by the user. For example, screen 870 may be displayed when requested food items have been lowered to the ground via a tether, and released from the tether (or the tether is released from the UAV).

Note that the distinction between the approach sub-phase, in-progress delivery sub-phase, and delivery completion may be particularly beneficial to the user-experience in the context of tethered UAV delivery. More specifically, tethered delivery can involve finding the appropriate area within the delivery location and/or the appropriate time (e.g., avoiding winds) to lower the food items. As such, tethered delivery can take longer, and is more significant part of the larger delivery process than, e.g., a delivery driver walking a pizza to a purchaser's front door. Further, for safety reasons, it may be desirable for the user to be clear of the delivery area until the food items are on the ground and have been released from the tether (or the tether is released from the UAV), and possibly until the UAV has flown a certain distance from the delivery area. At the same time, users typically appreciate having access to their food items as quickly as possible. By providing distinct graphical indications for arrival, in-progress tethered delivery, and completion of a tethered delivery, the user is better informed as to the status of their food delivery, such that they can safely pick up their food at the earliest time possible.

VIII. Additional Aspects of Client-Facing Application for UAV Transport

A. Status Information for Multi-UAV Deliveries

As noted above, there may be instances where multiple UAVs are utilized to fulfill a single order request. In such instances, a client-facing application may be operable to provide information related to the multiple UAVs fulfilling the same transport request.

For example, the client-facing application may show the locations of all UAVs fulfilling the same order on a map feature, such as those shown in FIGS. 8D to 8G. Alternatively, the client-facing application may only show the location of one of the UAVs that is fulfilling a given order. As an example, the client-facing application may only show the locations of the UAV that is the furthest from the target location and/or that is scheduled to be the last UAV to lower its food items to the ground in the delivery area. By only indicating the last UAV in the group, the client-facing application may provide an indication of the expected time that the entire order will be ready for retrieval from the delivery area (since safety considerations will likely prevent the user from retrieving any food items before all UAVs have lowered their food items to the ground).

B. Multi-Tasking Features

In a further aspect, an example client-facing application may provide multi-tasking features. One such multi-tasking feature may allow a user to track the status of their order while simultaneously using features other than status tracking (e.g., while using features that do not allow for full screen status tracking such as illustrated in FIGS. 8A to 8H).

Figure 9:
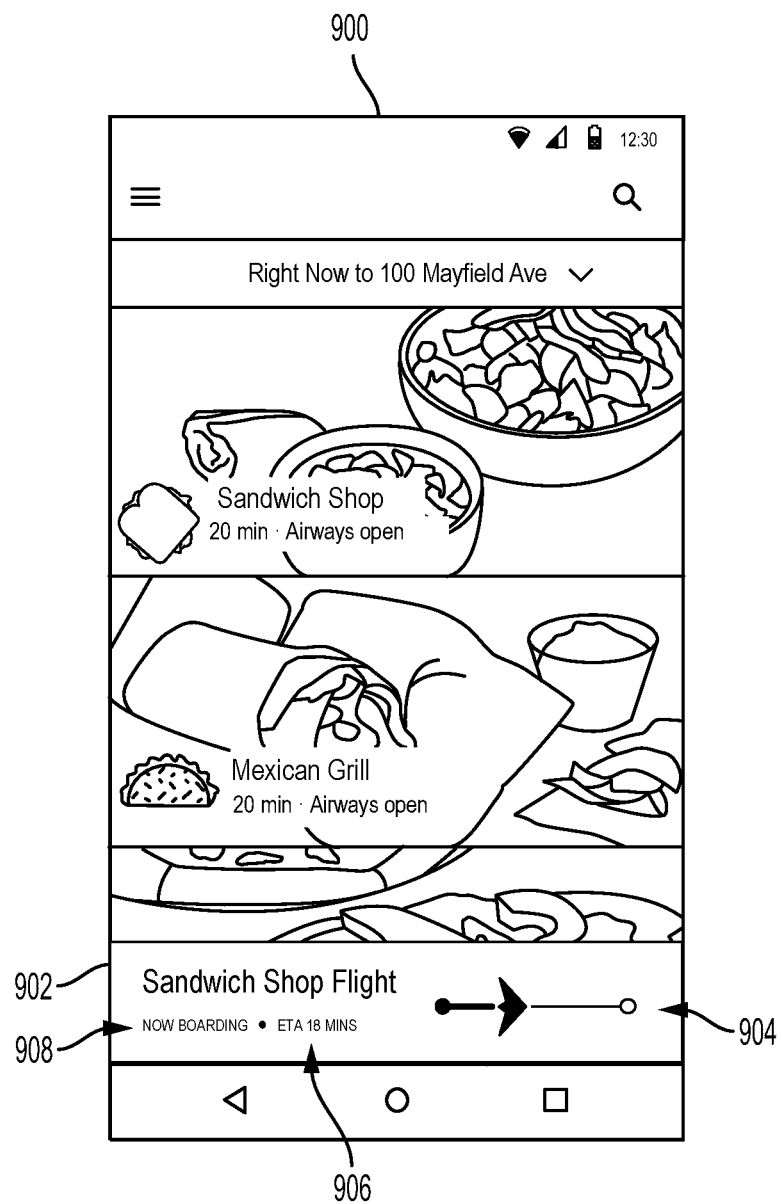
FIG. 9 is an illustration of another screen from an example client application for a UAV transport service, according to an example embodiment.

As an example, FIG. 9 is an illustration of a screen 900 from an example client application for a UAV transport service. Screen 900 includes a dynamic status bar 902. The status bar 902 may be displayed after a user has submitted a UAV transport request, while the user is using interface features other than a status tracking interface such as illustrated in FIGS. 8A to 8H. As such, if a user is viewing a full status tracking interface, such as shown in FIGS. 8A to 8H, and then navigates away from the full status tracking interface, status bar 902 may be displayed so that the user can continue to track the status of the fulfillment process for their UAV transport request while using other features of the application.

Status bar 902 includes status information 908 and an arrival time estimate 906. The status information 908 and the arrival time estimate 906 may be dynamically updated in status bar 902, in a similar manner the status information and arrival time estimate is updated in FIGS. 8A to 8H.

Further, status bar 902 includes a flight-progress feature 904. The flight-progress feature 904 may be displayed or become active once the flight phase of the fulfillment process has begun. As the UAV flight progresses, the arrow-shaped UAV graphic on the flight-progress feature 904 may be updated to indicate a current or recent distance of the UAV from the target location.

C. Delivery Area Obstructions

There may be situations where a UAV arrives at a target location, but unable to lower the requested items to the ground due to obstructions in the delivery area. For instance, a child, dog, piece of lawn furniture, or vehicle, may be located on the ground in the delivery, preventing delivery for safety reasons. Or, when a UAV arrives at a target location and surveys the specified delivery area, the UAV may discover that rainwater has pooled in the delivery rendering delivery undesirable at that location. Other examples are also possible.

Accordingly, an example client-facing application may provide status updates and/or functionality related to situations where delivery is delayed or possibly even canceled due to unforeseen obstructions in the delivery area. In scenarios where the UAV arrives and finds the delivery area is obstructed, the UAV may communicate and provide status information to a service-provider system, which in turn may provide information and support functionality related to alternative delivery options and/or canceling delivery.

For example, once an obstruction is detected in the delivery area, the client-facing application may display a screen indicating that an obstruction will delay the requested items being lowered to the ground. If the UAV determines that it can search for an alternate delivery area (e.g., associated with the same target location), the client application may also display an indication to this effect, which may identify the alternate delivery area. The client-facing application could also display an interface that allows the user to specify an alternate delivery location. Such an interface could include a map that identifies alternate delivery areas, such that the user can provide input specifying a particular one of the alternate delivery areas (e.g., an interface that functions similarly to the interfaces shown in FIGS. 6A to 6C.

Additionally or alternatively, a UAV or a service-provider system could determine that delivery is not possible due to an obstruction in the delivery area. Such a determination could be made with or without considering the possibility of alternate delivery areas. In either case, the client-facing application could display a screen indicating that the UAV delivery is being canceled due to an obstruction in the delivery area. Further, the client application may display interface features that allow the user to indicate a subsequent action, such as: (a) attempting delivery of the same physical items after the UAV returns to a distribution center or warehouse (which may be undesirable for some items, such as hot food), (b) restarting the fulfillment process so replacement item(s) are transported by a UAV (e.g., such that a restaurant prepares the same food items again, and a UAV transports the newly-prepared food to a different delivery area as soon as possible), or (c) canceling the order completely. Other options may also be provided.

D. Post-Delivery Issue Resolution

Once items have been delivered (e.g., lowered to the ground in the delivery area), an example client-facing application may display interface features that allow a user to report defective items and/or select corrective actions. In some cases, such interface features may allow the user that ordered the items to communicate directly with the item source (e.g., the restaurant from which food items were ordered).

Further, two-way issue resolution functionality may be provided via the combination of a client-facing application and an item-provider application. For example, the UAV food-delivery application and a corresponding food-provider application may allow a user to capture image(s) of an item they believe is defective or damaged, using a camera on the device that is providing the client-facing application. As a specific example, a user could take picture(s) of food that has spilled or has leaked during flight, food that lacks requested modifications from the standard menu, or an entire order that is lacking item(s) that were paid for. The image(s) may be sent to food provider's device and displayed by the food-provider application. The food-provider application may then provide interface features that allow the food provider to approve or deny UAV transport of replacement item(s). Other functionality for issue resolution and variations on the examples described above are of course possible.

IX. Conclusion

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method comprising:
receiving, by a client device, a transport request for transport of one or more items to a target location by an unmanned aerial vehicle (UAV), and responsively:
displaying, by the client device, a preparation status screen including a first arrival-time estimate, wherein the first arrival-time estimate is determined based at least in part on: (i) a preparation-to-loading time estimate for the one or more items, and (ii) a flight time estimate for transport of the one or more items to the target location by a UAV;
receiving a status message indicating that the one or more items are loaded on the UAV and responsively:
displaying, by the client device, a flight progress screen comprising: (a) a map comprising a location indication for the UAV, and (b) an updated arrival time, wherein the updated arrival time is determined based an updated flight time estimate for transport of the one or more items to the target location; and
receiving a status message indicating that the UAV has released the one or more items at the target location, and responsively displaying a delivery confirmation screen.

2. The method of claim 1, wherein the one or more items are one or more food items, and wherein the preparation-to-loading time estimate includes an estimated food preparation period.

3. The method of claim 1, wherein the preparation-to-loading time estimate corresponds to a pre-flight phase of a fulfillment process for the one or more items.

4. The method of claim 3, wherein the pre-flight phase comprises an item preparation sub-phase, the method further comprising:
during at least a portion of the item preparation sub-phase, displaying, in the preparation status screen, an indication that the one or more items are being prepared for transport.

5. The method of claim 4, wherein the indication that the one or more items are being prepared for transport comprises a characterization of the one or more items as being at a gate.

6. The method of claim 3, wherein the pre-flight phase comprises a loading sub-phase corresponding to a process of loading the one or more items onto the UAV, the method further comprising:
receiving an indication that the one or more items are being loaded onto the UAV; and
responsively displaying, in the preparation status screen, an indication that the one or more items are being loaded on to a UAV for transport.

7. The method of claim 6, wherein the indication that the one or more items are being loaded comprises a characterization of the one or more items as boarding a UAV.

8. The method of claim 1, wherein the flight time estimate corresponds to a flight phase of a fulfillment process for the one or more items.

9. The method of claim 8, wherein loading of the one or more items on to the UAV occurs at a source location, and wherein the flight phase comprises a departing sub-phase, the method further comprising:
determining that the one or more selected food items are loaded on the UAV and that the UAV is at or within a source area associated with the source location; and
responsively displaying, in a flight status screen, an indication that the UAV flight with the one or more selected is departing.

10. The method of claim 8, wherein loading of the one or more items on to the UAV occurs at a source location, and wherein the flight phase comprises a mid-flight sub-phase, the method further comprising:
determining that the UAV has left the source location or is more than a predetermined distance from the source location, and is not located at the target location or is more than a predetermined distance from the target location; and
responsively displaying, in the flight progress screen, an indication that the UAV is en route to the target location.

11. The method of claim 8, wherein the flight phase comprises an approach sub-phase, the method further comprising:
determining that the first UAV is at or within a threshold distance from the target location; and
responsively displaying, in the flight progress screen, an indication that the UAV is approaching the target location.

12. The method of claim 8, wherein the flight phase comprises a tethered-delivery sub-phase, the method further comprising:
- determining that the one or more items are being lowered from the UAV to the ground at the target location via a tether; and
- responsively displaying a delivery progress screen comprising an indication that the one or more items are being lowered to the ground at the target location.

13. The method of claim 12, wherein the delivery progress screen comprises a map showing a selected delivery area associated with the target location, wherein the selected delivery area is one of a plurality of delivery areas associated with the target location.

14. The method of claim 13, further comprising detecting a de-coupling of the one or more items from the tether, and responsively displaying the delivery confirmation screen.

15. The method of claim 1, further comprising, before receipt of the transport request:
- determining, by the client computing device, the target location corresponding to a client computing device; and
- displaying an order screen for selection of one or more items for UAV transport to the target location, wherein the input data comprising the transport request is received via the order screen.

16. The method of claim 15, wherein the transport request comprises an order for the one or more items, the method further comprising:
- in further response to receiving the transport request, displaying an order confirmation screen.

17. A computing system comprising:
- a communication interface operable for communications with a service-provider system for a unmanned aerial vehicle (UAV) transport service;
- at least one processor; and
- a non-transitory computer readable medium comprising program instructions stored thereon and executable by the at least one processor to cause the computing system to:
  - receive a transport request for transport of one or more items to a target location and responsively displaying a preparation status screen that comprises a first arrival-time estimate, wherein the first arrival-time estimate is determined based on a combination of at least (i) a preparation-to-loading time estimate for the one or more items, and (ii) a flight time estimate for transport of the one or more items to the target location by a UAV;
  - receive a status message indicating that the one or more items are ready for transport to the target location and responsively display a flight progress screen, wherein the flight progress screen comprises: (a) a map comprising a location indication for the UAV, and (b) an updated arrival time corresponding, wherein the updated arrival time is determined based an updated flight time estimate for transport of the one or more items to the target location; and
  - receive a status message indicating that the UAV has released the one or more items in a ground delivery area associated with the target location, and responsively display a delivery confirmation screen.

18. A method comprising:
- receiving, by a computing device, a transport request for transport of one or more items to a target location by an unmanned aerial vehicle (UAV);
- responsive to receiving the transport request, the client computing device:
  - (i) determining a total transport time based on a combination of at least (a) a preparation-to-loading time estimate for the one or more items, and (b) a flight time estimate for transport of the one or more items to the target location by a UAV;
  - (ii) sending a first status message to a client device, wherein the first status message comprises an arrival time corresponding to the total transport time;
- receiving, by the computing device, an indication that the one or more items are loaded on a UAV for transport to the target location and responsively:
  - (i) determining an updated total transport time based on an updated flight time estimate for transport of the one or more items to the target location;
  - (ii) sending a second status message to the client device, wherein the second status message comprises an updated arrival time corresponding to the updated total transport time; and
- receiving an indication that the UAV has released the one or more items at the target location and responsively sending a third message indicating to the client device to display a delivery confirmation screen.

19. The method of claim 18, wherein first status message provides an indication to the client device to display a preparation status screen indicating a transport-preparation status and the arrival time.

20. The method of claim 18, wherein the second status message provides an indication to the client device to display a flight progress screen comprising: (a) a map comprising a flight path visualization and a location indication for the first UAV, and (b) the updated arrival time.

* * * * *